(12) United States Patent
Zhu et al.

(10) Patent No.: US 9,787,537 B2
(45) Date of Patent: Oct. 10, 2017

(54) CUSTOMIZABLE MOBILE BROADBAND NETWORK SYSTEM AND METHOD FOR CUSTOMIZING MOBILE BROADBAND NETWORK

(71) Applicant: Huawei Technologies Co., Ltd., Shenzhen (CN)

(72) Inventors: Haobing Zhu, Shenzhen (CN); Jiang Li, Moscow (RU); Weihua Hu, Shanghai (CN); Yan Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 21 days.

(21) Appl. No.: 14/765,291

(22) PCT Filed: Jan. 31, 2013

(86) PCT No.: PCT/CN2013/071232
§ 371 (c)(1),
(2) Date: Jul. 31, 2015

(87) PCT Pub. No.: WO2014/117376
PCT Pub. Date: Aug. 7, 2014

(65) Prior Publication Data
US 2016/0006606 A1    Jan. 7, 2016

(51) Int. Cl.
*H04L 12/00* (2006.01)
*G06F 11/00* (2006.01)
(Continued)

(52) U.S. Cl.
CPC ...... *H04L 41/0803* (2013.01); *H04L 65/4084* (2013.01); *H04W 12/06* (2013.01);
(Continued)

(58) Field of Classification Search
None
See application file for complete search history.

(56) References Cited

U.S. PATENT DOCUMENTS

| 5,341,932 A | 8/1994 | Chen et al. |
| 2005/0079857 A1 | 4/2005 | Umezawa et al. |

(Continued)

FOREIGN PATENT DOCUMENTS

| CN | 1067860 A | 1/1993 |
| CN | 1607860 A | 4/2005 |

(Continued)

OTHER PUBLICATIONS

Kempf et al., "Moving the Mobile Evolved Packet Core to the Cloud," 2012 IEEE 8th International Conference on Wireless and Mobile Computing, Networking and Communications (WiMob), Barcelona, Spain, pp. 784-791, Institute of Electrical and Electronics Engineers, New York, New York (Oct. 8-10, 2012).

(Continued)

*Primary Examiner* — Edan Orgad
*Assistant Examiner* — Sithu Ko
(74) *Attorney, Agent, or Firm* — Leydig, Voit & Mayer, Ltd.

(57) ABSTRACT

Embodiments of the present invention provide a customizable mobile broadband network system and a method for customizing a mobile broadband network. The mobile broadband network system includes a forwarding layer, a control layer, and a capability opening layer. The forwarding capability and the control capability of the mobile broadband network system according to the embodiments of the present invention are decoupled from each other, and the capability opening layer combines a required capability according to the network customization request, so as to manage the corresponding customized-network instance.

(Continued)

Therefore, a mobile network can be customized according to a requirement of a user.

18 Claims, 9 Drawing Sheets

(51) Int. Cl.
| | | |
|---|---|---|
| *H04L 12/24* | (2006.01) | |
| *H04W 76/02* | (2009.01) | |
| *H04L 29/06* | (2006.01) | |
| *H04W 12/06* | (2009.01) | |
| *H04W 24/04* | (2009.01) | |
| *H04W 24/08* | (2009.01) | |
| *H04W 72/04* | (2009.01) | |

(52) U.S. Cl.
CPC ........... *H04W 24/04* (2013.01); *H04W 24/08* (2013.01); *H04W 72/04* (2013.01); *H04W 76/022* (2013.01)

(56) References Cited

U.S. PATENT DOCUMENTS

| | | | |
|---|---|---|---|
| 2007/0280177 A1 | 12/2007 | Uusikartano et al. | |
| 2008/0219268 A1* | 9/2008 | Dennison | ............ H04L 12/4625 370/395.2 |
| 2011/0103278 A1 | 5/2011 | Ozawa | |
| 2012/0023545 A1* | 1/2012 | Qu | ........................ H04L 45/04 726/1 |
| 2012/0151056 A1* | 6/2012 | Sporel | .................... H04L 45/02 709/225 |
| 2013/0232267 A1* | 9/2013 | Shatzkamer | ...... H04L 29/08765 709/226 |

FOREIGN PATENT DOCUMENTS

| | | |
|---|---|---|
| CN | 101064933 A | 10/2007 |
| CN | 102077558 A | 5/2011 |
| EP | 2538719 A2 | 12/2012 |
| EP | 2693704 A2 | 2/2014 |
| JP | 2010520663 A | 6/2010 |
| JP | 2014515237 A | 6/2014 |
| WO | WO 2008108984 A2 | 9/2008 |
| WO | WO 2011116715 A2 | 9/2011 |
| WO | WO 2012160465 A1 | 11/2012 |

OTHER PUBLICATIONS

First Office Action in corresponding Japanese Patent Application No. 2015-555520 (Sep. 6, 2016).

* cited by examiner

CUSTOMIZABLE MOBILE BROADBAND NETWORK SYSTEM AND METHOD FOR CUSTOMIZING MOBILE BROADBAND NETWORK

CROSS-REFERENCE

This application is a National Stage of International Patent Application No. PCT/CN2013/071232, filed on Jan. 31, 2013, which is hereby incorporated by reference in its entirety.

TECHNICAL FIELD

Embodiments of the present invention relate to the field of mobile communications, and in particular, to a customizable mobile broadband network system and a method for customizing a mobile broadband network.

BACKGROUND

With the evolution of mobile networks, wireless access bandwidth keeps increasing, a traditional circuit domain disappears, all services are uniformly borne in a packet switched domain, and the mobile networks enter a mobile broadband (MBB, Mobile Broadband) era. High bandwidth provided by an MBB network, in combination with innovation of an intelligent terminal, causes a transfer of plenty of Internet applications from a fixed access network to a mobile network, that is, the so-called mobile Internet. Currently, the MBB network bears not only traditional telecommunications services, such as voice and short message services. Various enriched Internet applications, such as instant messaging, online shopping, online banking, search, information, and video, are already mobilized. Currently, most data traffic of the mobile Internet comes from these applications.

All information consumption in the mobile Internet era occurs by using a terminal-pipe-cloud architecture. Data is exchanged, by using a pipe service of the mobile broadband network, between an Internet application server based on an information technology (IT, Information Technology) cloud platform and an application client on an intelligent terminal, so as to meet mobile users' requirements for access at any time and any place and for always staying online. Benefiting from decoupling between mobile services and mobile pipes, most services of a mobile user come from an Internet application provider instead of a telecommunications operator. As Internet applications are rapidly developing, innovations keep emerging. In addition to the foregoing plenty of IT applications, an emerging enterprise or Internet of Things (M2M, Machine to Machine) industry is gradually carrying out services based on the MBB network.

After applications and a bearer network are decoupled, in current mobile applications, data is commonly transmitted by using a mobile pipe as a transparent dumb pipe. The applications and the network are unaware of each other, and therefore, inevitably, optimal user experience of the applications cannot be achieved, and optimal utilization efficiency of a network resource cannot be achieved. This is unfavorable to an application service provider, a mobile network pipe provider, or the operator.

Currently, a mobile broadband network defined by the 3rd Generation Partnership Project (3GPP, The 3rd Generation Partnership Project) is a dedicated telecommunications network, which is relatively enclosed and rigid, and externally opens control capabilities of pipe charging and quality of service (QoS, Quality of Service) mainly through a policy and charging rules function (PCRF, Policy and Charging Rules Function) network element. Types of open capabilities are limited, and fast dynamic changes are not supported, causing a lack of resilience. In addition, currently, a PCRF network element of a mobile network externally provides only an Rx interface of policy control and charging control oriented to a service flow, and the Rx interface is currently used only for a proprietary service of the operator, thereby failing to effectively support a requirement for a customized mobile network for industrial applications or virtual operations.

For example, an enterprise or M2M industrial application based on the cloud platform often poses a particular requirement for the bearer network, including network functions, features, or capacity specifications. In addition, for example, some industries pose a stricter security or reliability requirement for a network, and some industries require high-bandwidth and low-latency guarantee. Some enterprise applications do not require complex charging or QoS guarantee, and do not require a high capacity, but require a lower cost. Current network architecture can hardly meet such a customization requirement.

SUMMARY

Embodiments of the present invention provide a customizable mobile broadband network system and a method for customizing a mobile broadband network, so that a network can be customized according to a requirement of a user.

According to a first aspect, a customizable mobile broadband network system is provided and includes: a forwarding layer, a control layer, and a capability opening layer. The forwarding layer connects to the control layer through a first open interface, and is configured to provide a forwarding capability of the mobile broadband network system, where the first open interface is configured to open the forwarding capability to the control layer; the control layer connects to the capability opening layer through a second open interface, and is configured to provide a control capability of the mobile broadband network system, where the second open interface is configured to open the control capability and the forwarding capability to the capability opening layer; and the capability opening layer is configured to receive, through a third open interface, a network customization request from a user, and combine the control capability and/or the forwarding capability according to the network customization request, so as to manage a customized-network instance.

With reference to the first aspect, in an implementation manner, the control layer further includes a forwarding control/resource management sublayer, configured to interact with the forwarding layer through the first open interface, so as to control a forwarding operation of the forwarding layer.

With reference to the first aspect and the foregoing implementation manner, in another implementation manner, the forwarding layer further includes a forwarding capability abstraction/resource agent sublayer, configured to manage access resources and forwarding resources of the forwarding layer.

With reference to the first aspect and the foregoing implementation manners, in another implementation manner, the forwarding capability abstraction/resource agent sublayer is further configured to abstract the forwarding capability of the forwarding layer, and provide the forwarding control/resource management sublayer of the control layer with information about an abstracted forwarding capability through the first open interface.

With reference to the first aspect and the foregoing implementation manners, in another implementation manner, the control layer further includes a control resource agent, configured to manage control resources of the control layer.

With reference to the first aspect and the foregoing implementation manners, in another implementation manner, the forwarding capability abstraction/resource agent sublayer is further configured to provide the forwarding control/resource management sublayer with information about the access resources and the forwarding resources, the control resource agent is further configured to provide the forwarding control/resource management sublayer with information about the control resources, and the forwarding control/resource management sublayer is further configured to manage network resources of the customized network system according to the information about the access resources and the forwarding resources and the information about the control resources.

With reference to the first aspect and the foregoing implementation manners, in another implementation manner, the control layer further includes a network application sublayer, the network application sublayer includes one or more network applications, and each of the network applications implements a specific control capability.

With reference to the first aspect and the foregoing implementation manners, in another implementation manner, the control layer further includes a capability abstraction sublayer, configured to abstract the forwarding capability of the forwarding layer and the control capability of the control layer to obtain an atomic-level forwarding capability and control capability, and open the atomic-level control capability and forwarding capability to the capability opening layer through the second open interface.

With reference to the first aspect and the foregoing implementation manners, in another implementation manner, the capability abstraction sublayer opens the atomic-level control capability and forwarding capability in a capability plug-in manner.

With reference to the first aspect and the foregoing implementation manners, in another implementation manner, the capability opening layer includes an on-demand mobile network enabler, configured to acquire the atomic-level control capability and forwarding capability from the capability abstraction sublayer, and combine the atomic-level control capability and forwarding capability according to the network customization request, so as to create, modify, or delete the customized-network instance.

With reference to the first aspect and the foregoing implementation manners, in another implementation manner, the on-demand mobile network enabler is specifically configured to select a required atomic-level control capability and forwarding capability according to the network customization request, send a resource allocation request to the capability abstraction sublayer, receive a result of network resource allocation that is performed by the capability abstraction sublayer and according to the resource allocation request, and combine the selected atomic-level control capability and forwarding capability based on the result of the network resource allocation, so as to create, modify, or delete the customized-network instance.

With reference to the first aspect and the foregoing implementation manners, in another implementation manner, the on-demand mobile network enabler further includes: a monitoring unit, configured to execute status monitoring and fault detection of the customized-network instance; or a configuring unit, configured to execute configuration management of the customized-network instance.

With reference to the first aspect and the foregoing implementation manners, in another implementation manner, an access controlling unit, a subscription database, and a policy database are further included. The subscription database is configured to store and manage authentication information of the user; the policy database is configured to store and manage capability opening and customized policy information of the user; and the access controlling unit is configured to authenticate the user according to the authentication information stored in the subscription database, determine an access policy of the user according to the policy information stored in the policy database, and provide the on-demand mobile network enabler with an authentication result and the access policy of the user.

With reference to the first aspect and the foregoing implementation manners, in another implementation manner, the access controlling unit, the subscription database, and/or the policy database is integrated in the capability opening layer.

With reference to the first aspect and the foregoing implementation manners, in another implementation manner, the third open interface includes a Web interface and/or an application programming interface.

With reference to the first aspect and the foregoing implementation manners, in another implementation manner, the capability opening layer is further configured to provide, through the third open interface, the user with an operation interface of the customized-network instance.

With reference to the first aspect and the foregoing implementation manners, in another implementation manner, the capability opening layer is specifically configured to receive, through the third open interface, an operation request of the user for the customized-network instance, the customized-network instance invokes a corresponding forwarding capability and/or control capability and a corresponding network resource according to the operation request, so as to complete a requested operation, and the capability opening layer returns an operation result to the user through the third open interface.

With reference to the first aspect and the foregoing implementation manners, in another implementation manner, the capability opening layer is further configured to provide the user with an operation handle of the customized-network instance, and the customized-network instance is specifically configured to invoke the corresponding forwarding capability and/or control capability and the corresponding network resource according to the operation handle included in the operation request, so as to complete the requested operation.

With reference to the first aspect and the foregoing implementation manners, in another implementation manner, the forwarding layer is implemented by a network forwarding node or a network switching node of the mobile broadband network system, the control layer is implemented by a network control node of the mobile broadband network system, and the capability opening layer is implemented by a capability opening node or a capability opening gateway of the mobile broadband network system.

According to a second aspect, a method for customizing a mobile broadband network is provided and includes: opening, by a forwarding layer, a forwarding capability of a mobile broadband network system to a control layer through a first open interface; opening, by the control layer, a control capability and the forwarding capability of the mobile broadband network system to a capability opening layer through a second open interface; and receiving, by the capability opening layer, a network customization request from a user through a third open interface, and combining the control capability and/or the forwarding capability according to the network customization request, so as to manage a customized-network instance.

With reference to the second aspect, in an implementation manner, the method further includes: receiving, by the capability opening layer, an operation request of the user for the customized-network instance through the third open interface; invoking, by the customized-network instance, a corresponding forwarding capability and/or control capability and a corresponding network resource according to the operation request, so as to complete a requested operation; and retuning, by the capability opening layer, an operation result to the user through the third open interface.

With reference to the second aspect and the foregoing implementation manner, in another implementation manner, the opening, by a forwarding layer, a forwarding capability of a mobile broadband network system to a control layer through a first open interface includes: abstracting, by the forwarding layer, the forwarding capability of the forwarding layer, and providing a forwarding control/resource management sublayer of the control layer with information about an abstracted forwarding capability through the first open interface.

With reference to the second aspect and the foregoing implementation manners, in another implementation manner, the opening, by the control layer, a control capability and the forwarding capability of the mobile broadband network system to a capability opening layer through a second open interface includes: abstracting, by the control layer, the forwarding capability of the forwarding layer and the control capability of the control layer to obtain an atomic-level forwarding capability and control capability, and opening the atomic-level control capability and forwarding capability to the capability opening layer through the second open interface.

With reference to the second aspect and the foregoing implementation manners, in another implementation manner, the combining, by the capability opening layer, the control capability and/or the forwarding capability according to the network customization request, so as to manage a customized-network instance includes: acquiring, by the capability opening layer, the atomic-level control capability and forwarding capability from the control layer, and combining the atomic-level control capability and forwarding capability according to the network customization request, so as to create, modify, or delete the customized-network instance.

According to a third aspect, a forwarding layer device in a customizable mobile broadband network system is provided and includes: a forwarding unit, configured to provide a forwarding capability of the mobile broadband network system; and a first open interface, configured to connect to a control layer device of the mobile broadband network system, and open the forwarding capability of the forwarding unit to the control layer device.

With reference to the third aspect, in an implementation manner, the forwarding layer device further includes: a resource agent unit, configured to manage access resources and forwarding resources of the forwarding layer device, and provide the control layer device with information about the access resources and the forwarding resources.

With reference to the third aspect and the foregoing implementation manner, in another implementation manner, the forwarding unit is specifically configured to abstract the forwarding capability of the forwarding layer device, and provide the control layer device with information about an abstracted forwarding capability through the first open interface.

With reference to the third aspect and the foregoing implementation manners, in another implementation manner, the forwarding layer device includes a network forwarding node or a network switching node of the mobile broadband network system.

According to a fourth aspect, a control layer device in a customizable mobile broadband network system is provided and includes: a controlling unit, configured to receive, from a forwarding layer device of the mobile broadband network system, information about a forwarding capability of the forwarding layer device, and provide a control capability of the mobile broadband network system; and a second open interface, configured to connect to a capability opening layer device of the mobile broadband network system, and open the control capability and the forwarding capability to the capability opening layer device.

With reference to the fourth aspect, in an implementation manner, the controlling unit is further configured to interact with the forwarding layer device, so as to control a forwarding operation of the forwarding layer device.

With reference to the fourth aspect and the foregoing implementation manner, in another implementation manner, the control layer device further includes a control resource agent unit, configured to manage control resources of the control layer device, and provide the capability opening layer device with information about the control resources.

With reference to the fourth aspect and the foregoing implementation manners, in another implementation manner, the controlling unit includes: one or more network applications, where each of the network applications implements a specific control capability.

With reference to the fourth aspect and the foregoing implementation manners, in another implementation manner, the controlling unit is specifically configured to abstract the forwarding capability of the forwarding layer device and the control capability of the control layer device to obtain an atomic-level forwarding capability and control capability, and the second open interface is specifically configured to open the atomic-level control capability and forwarding capability to the capability opening layer device.

With reference to the fourth aspect and the foregoing implementation manners, in another implementation manner, the control layer device includes a network control node of the mobile broadband network system.

According to a fifth aspect, a capability opening layer device in a customizable mobile broadband network system is provided and includes: a third open interface, configured to receive a network customization request from a user; and a customizing unit, configured to combine a control capability and/or a forwarding capability according to the network customization request, so as to manage a customized-network instance.

With reference to the fifth aspect, in an implementation manner, the customizing unit is further configured to receive information about network resources of the mobile broadband network system from a control layer device of the mobile broadband network system, and manage network resources of the customized network according to the information about the network resources.

With reference to the fifth aspect and the foregoing implementation manner, in another implementation manner, the customizing unit is specifically configured to acquire an atomic-level control capability and forwarding capability from the control layer device, and combine the atomic-level control capability and forwarding capability according to the network customization request, so as to create, modify, or delete the customized-network instance.

With reference to the fifth aspect and the foregoing implementation manners, in another implementation manner, the customizing unit is further configured to execute status monitoring and fault detection of the customized-network instance; or configured to execute configuration management of the customized-network instance.

With reference to the fifth aspect and the foregoing implementation manners, in another implementation manner, an access controlling unit, a subscription database, and a policy database are further included, where:

the subscription database is configured to store and manage authentication information of the user; the policy database is configured to store and manage capability opening and customized policy information of the user; and the access controlling unit is configured to authenticate the user according to the authentication information stored in the subscription database, determine an access policy of the user according to the policy information stored in the policy database, and provide the customizing unit with an authentication result and the access policy of the user.

With reference to the fifth aspect and the foregoing implementation manners, in another implementation manner, the third open interface includes a Web interface and/or an application programming interface.

With reference to the fifth aspect and the foregoing implementation manners, in another implementation manner, the third open interface is further configured to receive an operation request of the user for the customized-network instance, the customized-network instance invokes a corresponding forwarding capability and/or control capability and a corresponding network resource according to the operation request, so as to complete a requested operation, and the third open interface is further configured to return an operation result to the user.

With reference to the fifth aspect and the foregoing implementation manners, in another implementation manner, the third open interface is further configured to provide the user with an operation handle of the customized-network instance; and the customized-network instance is specifically configured to invoke the corresponding forwarding capability and/or control capability and the corresponding network resource according to the operation handle included in the operation request, so as to complete the requested operation.

With reference to the fifth aspect and the foregoing implementation manner, in another implementation manner, the capability opening layer device includes a capability opening node or a capability opening gateway of the mobile broadband network system.

In the embodiments of the present invention, a forwarding capability and a control capability of a mobile broadband network system are decoupled from each other, provided by a forwarding layer and a control layer respectively, and opened to a capability opening layer. The capability opening layer combines a required capability according to a network customization request, so as to manage a corresponding customized-network instance. Therefore, according to the mobile broadband network system in the embodiments of the present invention, a mobile network can be customized according to a requirement of a user, thereby implementing a comprehensive and flexible mobile network architecture.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The technical solutions of the present invention may be applied to various communications systems, such as a Global System for Mobile Communications (GSM, Global System of Mobile communication), a Code Division Multiple Access (CDMA, Code Division Multiple Access) system, Wideband Code Division Multiple Access (WCDMA, Wideband Code Division Multiple Access) system, General Packet Radio Service (GPRS, General Packet Radio Service) system, and Long Term Evolution (LTE, Long Term Evolution) system.

A user equipment (UE, User Equipment), also called a mobile terminal (Mobile Terminal), a mobile user equipment, or the like, may communicate with one or more core networks over a radio access network (for example, RAN, Radio Access Network). The user equipment may be a mobile terminal, such as a mobile phone (or called a "cellular" phone) or a computer equipped with a mobile terminal. For example, the user equipment may be a portable, pocket-sized, handheld, computer-embedded, or vehicle-mounted mobile apparatus, which exchanges voices and/or data with the radio access network.

A base station may be a base transceiver station (BTS, Base Transceiver Station) in GSM or CDMA, a NodeB (NodeB) in WCDMA, or an evolved NodeB (eNB or e-NodeB, evolved Node B) in LTE, which is not limited in the present invention.

Figure 1:
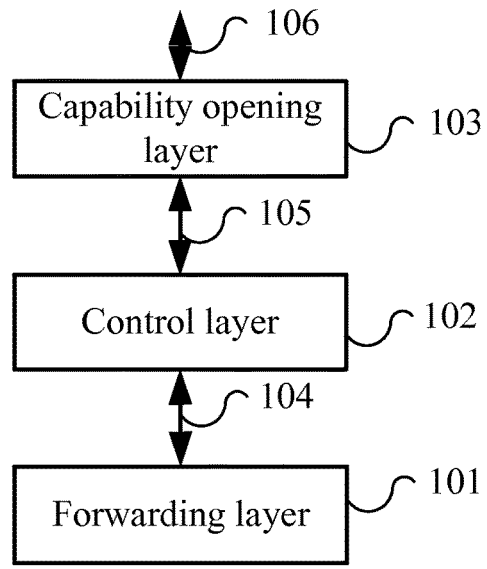
FIG. 1 is a schematic block diagram of a customizable mobile broadband network system according to an embodiment of the present invention.

FIG. 1 is a schematic block diagram of a customizable mobile broadband network system according to an embodiment of the present invention. A mobile broadband network system 100 in FIG. 1 includes a forwarding layer 101, a control layer 102, and a capability opening layer 103.

The forwarding layer 101 connects to the control layer 102 through a first open interface 104. The forwarding layer 101 is configured to provide a forwarding capability of the mobile broadband network system 100. The first open interface 104 is configured to open the forwarding capability to the control layer 102.

The control layer 102 connects to the capability opening layer 103 through a second open interface 105. The control layer 102 is configured to provide a control capability of the mobile broadband network system 100. The second open interface 105 is configured to open the control capability and the forwarding capability to the capability opening layer 103.

The capability opening layer 103 is configured to receive, through a third open interface 106, a network customization request from a user, and combine the control capability and/or the forwarding capability according to the network customization request, so as to manage a customized-network instance.

In this embodiment of the present invention, a forwarding capability and a control capability of a mobile broadband network system are decoupled from each other, provided by a forwarding layer and a control layer respectively, and opened to a capability opening layer. The capability opening layer combines a required capability according to a network customization request, so as to manage a corresponding customized-network instance. Therefore, according to the mobile broadband network system in this embodiment of the present invention, a mobile network can be customized according to a requirement of a user, thereby implementing a comprehensive and flexible mobile network architecture.

The user who submits the network customization request may be an enterprise application, a personal application, a user application in another form, or the like of an operator or a third-party partner. A specific form of the user is not limited in this embodiment of the present invention. In this embodiment of the present invention, the mobile broadband network system 100 can manage the customized-network instance according to the network customization request submitted by the user, that is, create, delete, or modify the customized-network instance.

For example, it is an uneconomical choice for an enterprise to implement network customization by building a dedicated network of the enterprise. According to this embodiment of the present invention, the operator can provide a virtual or customized network that meets a requirement of the enterprise, so as to implement more favorable and in-depth cooperation. For these network customization requirements, a network needs to have a more efficient and flexible customizable capability to implement on-demand resource allocation and on-demand network capability customization.

The forwarding layer 101 may also be called a data layer or a user layer. The forwarding layer 101 is implemented by a network forwarding node or a network switching node of the mobile broadband network system 100. An example of the network forwarding node or the network switching node includes a forwarding function part of a wireless base station, and a core network gateway, or the like. A basic forwarding capability may include but is not limited to: data plane functions of the base station, such as physical layer coding and decoding, and Packet Data Convergence Protocol (PDCP, Packet Data Convergence Protocol) packet encapsulation and decapsulation; and a forwarding capability of the gateway, such as GPRS Tunneling Protocol (GTP, GPRS Tunnel Protocol) or Generic Routing Encapsulation (GRE, Generic Routing Encapsulation) tunnel encapsulation and decapsulation, and Internet Protocol (IP, Internet Protocol) packet or Media Access Control (MAC, Media Access Control) packet forwarding and routing. After being abstracted or normalized, the basic forwarding capability of the forwarding layer 101 is opened through the first open interface 104. The first open interface 104 may be a programmable interface, and may be expanded, for example, by using the GTP protocol or another protocol such as H.248. Optionally, the forwarding layer 101 keeps only a basic data forwarding function, and all other control functions are stripped to the control layer 102.

The control layer 102 is implemented by a network control node of the mobile broadband network system 100. An example of the network control node includes a control function part of a mobility management network element, a base station controller, a gateway, or the like. A basic control capability may include but is not limited to: mobility management, bearer management, a policy control function, GTPC protocol processing, and the like.

The capability opening layer 103 is implemented by a capability opening node or a capability opening gateway of the mobile broadband network system 100. The capability opening node or the capability opening gateway may be a node device disposed separately, or may also be integrated in any network element, for example, integrated in a gateway.

Optionally, as another embodiment, the capability opening layer 103 may provide, through the third open interface 106, the user with an operation interface for the customized-network instance, so that the user can perform a specific service operation, such as video downloading, or calling over the Internet, by using the customized-network instance. In this case, the capability opening layer 103 may receive, through the third open interface 106, an operation request of the user for the customized-network instance, the customized-network instance invokes a corresponding forwarding capability and/or control capability and a corresponding network resource according to the operation request, so as to complete a requested operation, and the capability opening layer 103 returns an operation result to the user through the third open interface 106.

Optionally, as another embodiment, the capability opening layer 103 may provide the user with an operation handle of the customized-network instance, so that the user can execute a specific service on a customized network. For example, the capability opening layer 103 may send the operation handle to the user after the customized-network instance is created. The operation request sent by the user to the capability opening layer 103 may include a specific operation handle, so as to represent a service operation that the user wants to execute. The customized-network instance may invoke a corresponding forwarding capability and/or control capability and a corresponding network resource according to the operation handle included in the operation request, so as to complete a requested operation.

In this embodiment of the present invention, a control capability and a forwarding capability of the network are completely decoupled, and functions of the network may completely depend on service software of the control layer 102 and are irrelevant to the forwarding layer 101, thereby truly supporting a more flexible network instance defined by the software.

Using a 4G evolved NodeB eNodeB as an example, the eNodeB may be decoupled into a control plane evolved NodeB eNodeB-C that provides the control capability and a user plane evolved NodeB eNodeB-U that provides the forwarding capability.

Using a gateway as an example, the gateway may be decoupled into a control plane gateway GW-C that provides the control capability and a user plane gateway GW-U that provides the forwarding capability. Specifically, if the gateway is a packet data network gateway (PGW, Packet Data Network Gateway), the GW-C may be expressed as a PGW-C, and the GW-U may be expressed as a PGW-U; if the gateway is a service gateway (SGW, Service Gateway), the GW-C may be expressed as an SGW-C, and the GW-U may be expressed as an SGW-U; and if the gateway is a gateway GPRS support node (GGSN, Gateway GPRS Support Node), the GW-C may be expressed as a GGSN-C, and the GW-U may be expressed as a GGSN-U.

Specifically, for example, the GW-U is responsible for packet forwarding, tunnel encapsulation and decapsulation of a user packet, execution of QoS guarantee, execution of charging (duration statistics, traffic statistics, and event reporting), execution of monitoring, and the like, without a need of considering a specific functional application scenario of the gateway, for example, whether the gateway is a gateway supporting 3G access or a gateway supporting 4G (that is, LTE) access. Optionally, the GW-U may be further responsible for caching, encrypted compression, virus prevention, network address translation (NAT, Network Address Translation), deep packet inspection (DPI, Deep Packet Inspection), and the like.

An application scenario may be completely defined by the control layer software. For example, the GW-C is responsible for policy control, charging control, monitoring control, IP routing control, L2 access, mobility management, bearer management, and the like. Optionally, the GW-C may be further responsible for DPI control and the like.

Figure 2:
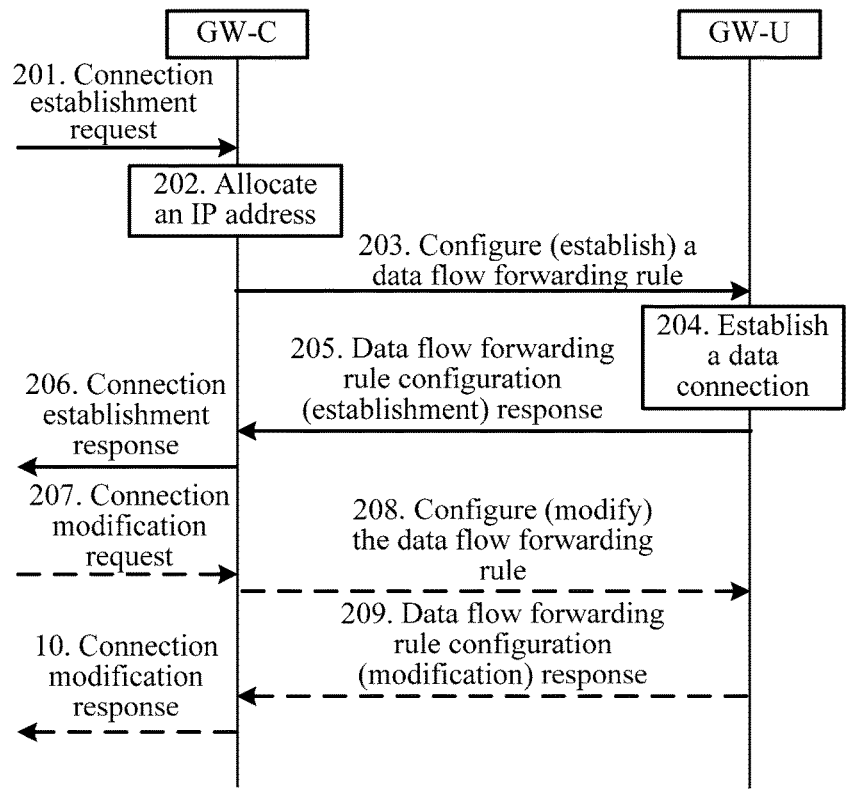
FIG. 2 is an example of a flow for configuring (creating/modifying) an IP data connection between a GW-C and a GW-U.

FIG. 2 is an example of a flow for configuring (creating/modifying) an IP data connection between a GW-C and a GW-U.

201. The GW-C receives a connection establishment request message, such as a session creation, bearer creation, or Packet Data Protocol (PDP, Packet Data Protocol) message. The connection establishment request message may include an IP address type (IPv4, IPv6, or IPv4+IPv6) and an access point name (APN, Access Point Name) of a connection. Optionally, the connection establishment request message may further include information about a peer network element and data connection identifier information.

202. The GW-C allocates an IP address to a UE. Further, the IP address allocated by the GW-C may be acquired from an internal address pool of the GW-C, or may also be an IP address acquired from an external Dynamic Host Configuration Protocol (DHCP, Dynamic Host Configuration Protocol) server or Authentication, Authorization and Accounting (AAA, Authentication, Authorization and Accounting) server. If an IP address type of the UE is IPv4, the GW-C allocates an IPv4 address to the UE. If the IP address type (PDN type) of the UE is IPv6, the GW-C allocates an IPv6 address prefix to the UE. If the IP address type (PDN type) of the UE is IPv4v6, the GW-C needs to allocate both an IPv4 address and an IPv6 address prefix to the UE. Further, an IP address type (PDN type) of the APN may be configured on the GW-C, and it is determined, according to the configured IP address type and the IP address type of the UE, that an IPv4 address and/or an IPv6 address is to be allocated to the UE.

Further, if a requested APN is a virtual private network (VPN, Virtual Private Network) service, the GW-C needs to interact with a server (which is a Radius/Diameter/DHCP server) in a VPN, so as to complete a VPN access authentication process, and obtain information about a peer VPN network element (such as an IP address and a port number) and data path information (such as a data path protocol and a data path identifier).

203. The GW-C sends a data flow forwarding rule configuration (establishment) message to the GW-U. In a general case, the data flow forwarding rule configuration (establishment) message carries channel configuration information of at least one data flow. The channel configuration information of the data flow includes information about a local network element (GW-U) (optional), the information about the peer network element (optional), a channel identifier, data flow information, and data flow-associated information (an IP address). Generally, the data flow forwarding rule configuration (establishment) message carries data channel configuration information of at least one data connection to an access network.

Further, in a scenario in which a requested connection is a VPN service, the data flow forwarding rule configuration (establishment) message may further carry configuration information of at least one data channel between the GW-U and a PDN, where the configuration information of the data channel includes the information about the local network element (GW-U), the information about the peer network element, the channel identifier, the data flow information, and the data flow-associated information. The information about the peer network element includes VPN network element information. The channel identifier includes a tunneling protocol for connecting the VPN and a tunnel identifier. An example of the tunnel identifier includes an L2TP tunnel identifier, a session identifier, a GRE key, and the like.

204. The GW-U establishes a data channel used to transmit data, and configures a corresponding data flow rule.

205. The GW-U returns a data flow forwarding rule configuration (establishment) response message to the GW-C. If the GW-C does not carry the information about the local network element (GW-U) in the data flow forwarding rule configuration (establishment) message, the GW-U may carry the information about the local network element in the response message.

206. The GW-C returns a connection establishment response message. The connection establishment response message includes the information about the local network element (GW-U) and IP address information of the UE.

If the connection establishment request message does not include the information about the peer network element, steps 207 to 210 may be further executed.

207. The GW-C receives a connection modification request message (such as a bearer modification request or a PDP updating request). The connection modification request message caries the information about the peer network element.

208. The GW-C sends a data flow forwarding rule configuration (modification) request message, where the data flow forwarding rule configuration (modification) request message includes the information about the peer network element.

209. The GW-U updates the information about the peer network element that is in configuration information of an established data connection. The GW-U returns a data flow forwarding rule configuration (modification) response message.

210. The GW-C returns a connection modification response message.

In this way, separation of a control plane of a gateway from a user plane of the gateway is implemented. In this embodiment of the present invention, implementation of the GW-C is a part of a control layer, and implementation of the GW-U is a part of a forwarding layer.

Figure 3:
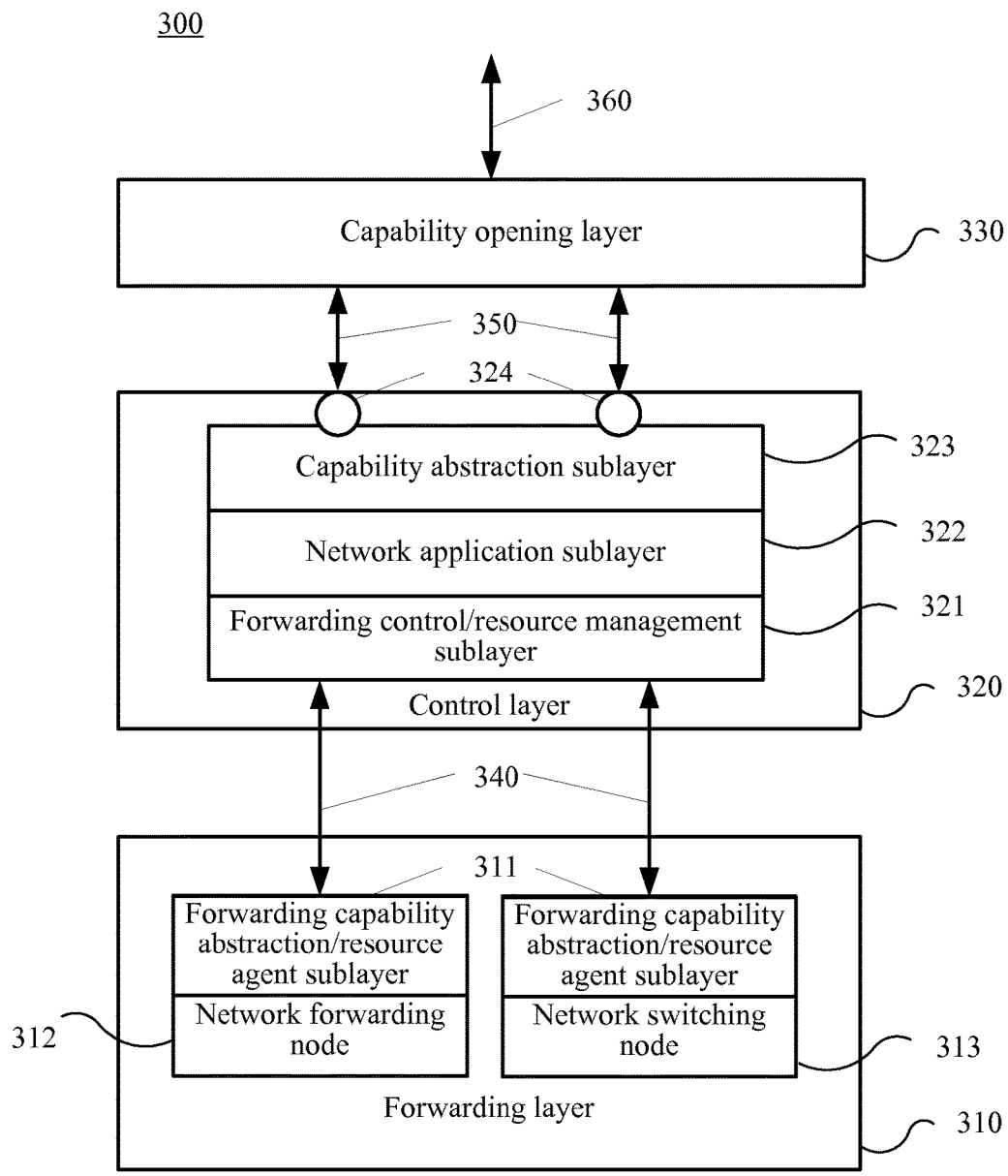
FIG. 3 is a schematic architectural diagram of another example of an MBB network system according to an embodiment of the present invention.

FIG. 3 is a schematic architectural diagram of another example of an MBB network system according to an embodiment of the present invention. An MBB network system 300 shown in FIG. 3 is a specific example of the mobile broadband network system 100 shown in FIG. 1, and FIG. 3 depicts a sublayer structure of the MBB network system 300.

As shown in FIG. 3, the MBB network system 300 includes a forwarding layer 310, a control layer 320, and a capability opening layer 330.

The control layer 320 includes a forwarding control/resource management sublayer 321, configured to interact with the forwarding layer 310 through a first open interface 340, so as to control a forwarding operation of the forwarding layer 310.

The forwarding layer 310 further includes a forwarding capability abstraction/resource agent sublayer 311, configured to manage access resources and forwarding resources of the forwarding layer 310. Optionally, as another embodiment, the forwarding capability abstraction/resource agent sublayer 311 is further configured to abstract a forwarding capability of the forwarding layer 310, and provide the forwarding control/resource management sublayer 321 of the control layer 320 with information about an abstracted forwarding capability through the first open interface 340.

However, in this embodiment of the present invention, the forwarding capability abstraction/resource agent sublayer 311 may also not perform abstraction processing on the forwarding capability; instead, a capability abstraction sublayer 323 of the control layer 320 performs the abstraction processing. For example, when the forwarding capability of the forwarding layer 310 is locally configured by the control layer 320 and does not need to be notified by the forwarding layer 310 to the control layer 320, the capability abstraction sublayer 323 may directly perform the abstraction processing on the forwarding capability.

Specifically, as shown in FIG. 3, the forwarding capability abstraction/resource agent sublayer 311 may be implemented on a network forwarding node 312 or a network switching node 313, and abstract a forwarding capability of the network forwarding node 312 or the network switching node 313. Capability abstraction refers to normalizing, classifying, and aggregating various capabilities of different platforms or technologies, so as to obtain an atomic-level capability, thereby shielding a specific platform and technology from an upper layer. For example, in different communications standards, a specific definition and implementation form (such as a software form or a hardware form) of QoS may differ, but may contain parameters of same or similar nature, such as throughput, a transmission delay, or an error rate that needs to be ensured. During abstraction of a QoS-related capability, such parameters are extracted for classification and aggregation to obtain an atomic-level QoS capability. In addition, different applications require different charging methods, which may be classified, by real-time nature, into online charging and offline charging, and may be classified, by tariff, into linear charging, package charging, and the like. However, all of these may be abstracted into time-based, traffic-based, or event-based charging. All related charging requirements can be met, as long as the forwarding layer provides time-based and traffic-based statistics and reporting, and supports event-based subscription and reporting. For another example, tunnel encapsulation and decapsulation of a packet header may be uniformly abstracted as encapsulating or decapsulating, according to a specified offset, a packet header of a specified packet length, so that all encapsulation and decapsulation operations required by a tunneling protocol can be supported.

In FIG. 3, for brevity, only one network forwarding node 312 and one network switching node 313 are depicted. In this embodiment of the present invention, however, the number of network forwarding nodes 312 or network switching nodes 313 included in the forwarding layer 310 is not limited.

The control layer 320 further includes a network application sublayer 322. The network application sublayer 322 includes one or more network applications, and each network application implements a specific control capability, such as mobile access control, mobility management, a policy and charging function, or end user subscription information management. A function of a network application relates to a specific platform and technology.

The control layer 320 further includes a capability abstraction sublayer 323, configured to abstract the forwarding capability of the forwarding layer 310 and a control capability of the control layer 320, so as to obtain an atomic-level forwarding capability and control capability, and open the atomic-level forwarding capability and control capability to the capability opening layer 330 through the second open interface 350.

Optionally, as an embodiment, the capability abstraction sublayer 323 may open the atomic-level control capability and forwarding capability in a capability plug-in manner, such as a capability plug-in 324 shown in FIG. 3. The capability plug-in manner better facilitates capability combination of the capability opening layer 330. For brevity, FIG. 3 depicts two capability plug-ins 324. However, in this embodiment of the present invention, the number of capability plug-ins is not limited.

Specifically, the capability abstraction sublayer 323 is responsible for abstraction processing, classification, and aggregation of network capabilities (including a control capability and a forwarding capability) of the entire MBB network system 300, and shielding a specific implementation platform and technology of a bottom layer from an upper layer.

The capability opening layer 330 is responsible for combining simplex and scattered atomic-level network capabilities, so as to form different customized-network instances to meet a customization requirement of a user. The capability opening layer 330 opens the network capabilities of the MBB network system 300 to the user through a third open interface 360. Optionally, the third open interface 360 may include a Web interface and/or an application programming interface (API, Application Programming Interface), thereby forming an API that can be opened externally and a capability customization requirement entrance, so as to serve an upper-layer service application.

Specifically, the capability opening layer 330 may receive a network customization request from the user through the third open interface 360, so as to create, delete, or modify a customized-network instance according to the network customization request.

In addition, the capability opening layer 330 may receive an operation request of the user for the customized-network instance through the third open interface 360, and the customized-network instance invokes a corresponding forwarding capability and/or control capability and a corresponding network resource according to the operation request, so as to complete a requested operation. Then the capability opening layer 330 returns an operation result to the user through the third open interface 360.

In this way, by using a hierarchical architecture of a forwarding layer, a control layer, and a capability layer, network customization and an operation for a customized network can be flexibly implemented in this embodiment of the present invention.

Figure 4:
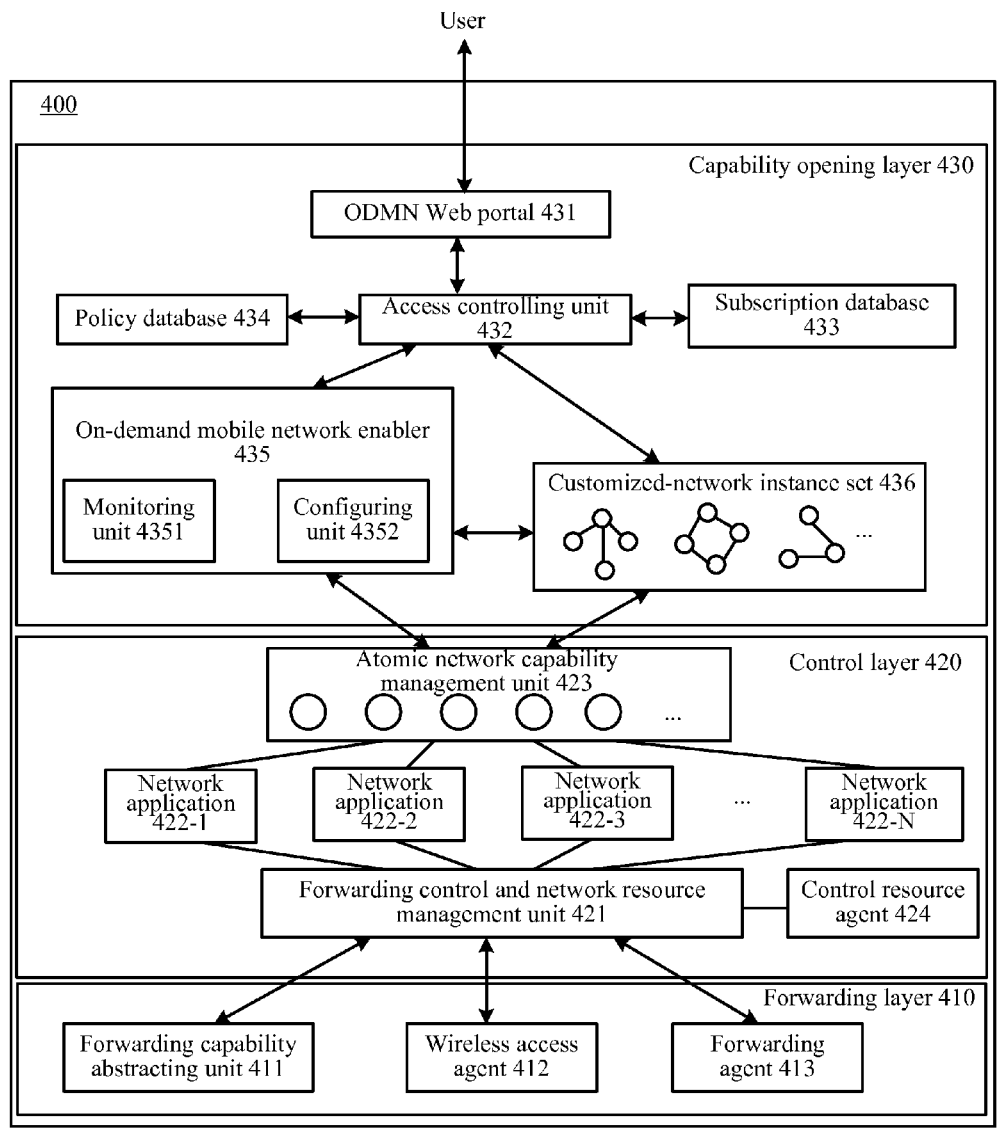
FIG. 4 is a schematic architectural diagram of another example of an MBB network system according to an embodiment of the present invention.

FIG. 4 is a schematic architectural diagram of another example of an MBB network system according to an embodiment of the present invention. An MBB network system 400 in FIG. 4 is a specific example of the MBB network system 300 in FIG. 3, and FIG. 4 depicts some specific functional units of the MBB network system 400.

The MBB network system 400 includes a forwarding layer 410, a control layer 420, and a capability opening layer 430. For brevity, FIG. 4 does not depict interfaces between the layers.

The forwarding layer 410 includes a forwarding capability abstracting unit 411, a wireless access agent 412, and a forwarding agent 413. The forwarding capability abstracting unit 411, the wireless access agent 412, and the forwarding agent 413 together implement the forwarding capability abstraction/resource agent sublayer 311 in FIG. 3.

The forwarding capability abstracting unit 411 is responsible for abstracting a forwarding capability of the forwarding layer, and opens an abstracted forwarding capability to a forwarding control and network resource managing unit 421 of the control layer 420 through a programmable interface. The forwarding control and network resource managing unit 421 implements the forwarding control/resource management sublayer 321 in FIG. 3.

According to another aspect, the forwarding control and network resource managing unit 421 may control a forwarding operation of the forwarding layer 410 downward through a programmable interface.

The wireless access agent 412 is responsible for local management of access resources, such as air interface resource management of a wireless base station. The forwarding agent 413 is responsible for local management of network data forwarding resources, such as data forwarding resources of a gateway and a base station. The access resources and the forwarding resources form network resources of the forwarding layer 410.

The control layer 420 further includes a control resource agent 424, configured to manage control resources of the control layer 420. The control resources may include computing resources, storage resources, and the like. The access resources, the forwarding resources, and the control resources form network resources of the MBB network system 400.

The wireless access agent 412 provides the forwarding control and network resource managing unit 421 with information about the access resources, and the forwarding agent 413 provides the forwarding control and network resource managing unit 421 with information about the forwarding resources. According to another aspect, the control resource agent 424 provides the forwarding control and network resource managing unit 421 with information about the control resources.

The forwarding control and network resource managing unit 421 may manage network resources of a customized network according to the information about the access resources and the forwarding resources and the information about the control resources, for example, request and allocate a network resource during creation of the customized network, and invoke a corresponding resource in an operation process of the customized network.

The control layer 420 includes N network applications 422-1 to 422-N, each of which implements a specific control capability, such as mobile access control, mobility management, a policy and charging function, or end user subscription information management. These functions relate to a specific platform and technology. The network applications 422-1 to 422-N implement the network application sublayer 322 shown in FIG. 3. In the following description, the network applications 422-1 to 422-N are collectively called a network application 422.

The control layer 420 further includes an atomic network capability managing unit 423. The atomic network capability managing unit 423 implements the capability abstraction sublayer 323 shown in FIG. 3, and is responsible for classifying and aggregating network capabilities (including a control capability and a forwarding capability) of the MBB network system 400, opening various atomic-level network capabilities of the MBB network 400 to the capability opening layer 430 in a capability plug-in (indicated by circles shown in FIG. 4) manner, and shielding a specific implementation platform and technology of a bottom layer. An example of an atomic-level network capability includes but is not limited to a flow forwarding capability (QoS), a user perception capability (an identifier, a location, a subscription attribute, a package, and interest), a pipe resource defining capability (a topology, performance, a capacity, reliability, and time validity), and the like.

A same atomic network capability may be simultaneously invoked by multiple network instances, causing contention for and collision of resources of a same category. To avoid such a case and implement independence and quality of service of resource invocation performed by different instances, the atomic network capability managing unit 423 of the control layer 420 is capable of implementing an atomic network capability virtualization function, that is, virtualizing each kind of atomic network capabilities into multiple same instances, where each virtual atomic network capability is separately invoked by different mobile network instances. SLA parameters, such as interface bandwidth, a forwarding rate, and an invoking priority, determine quality of service of use of a network resource that corresponds to a virtual atomic network capability. A method for implementing virtualization of the atomic network capabilities includes a resource fragmentation method or a resource virtualization instance method. In the so-called resource fragmentation method, all virtual atomic network capabilities share same network applications and forwarding resources, and each virtual instance occupies different resource space, such as an IP address segment, a flow entry range, or a port range; and in the so-called resource virtualization instance method, for each virtual atomic network capability, the atomic network capability managing unit creates an independent network application and forwarding instance, such as a virtual machine, which is logically completely isolated. A virtual machine resource managing unit may manage global virtual machines on a control plane.

The capability opening layer 430 includes an on-demand mobile network (ODMN, On Demand Mobile Network) Web portal 431, which provides an open interface that is based on a Web service for an operator and a third-party partner to access. The ODMN Web portal 431 is an implementation form of the third open interface 360 shown in FIG. 3.

The capability opening layer 430 further includes an access controlling unit 432, a subscription database 433, and a policy database 434. The subscription database 433 stores and manages authentication information of a user, such as a user identifier and a user class of an owner of a mobile customizable network, and a service level agreement (SLA, Service Level Agreement) about usage of a network resource or function. The policy database 434 stores and manages capability opening and customized policy information of the user, for example, stores policy information, including a single-user policy and a global system policy, in a process of creating, operating, modifying, or deleting the mobile customizable network. The single-user policy stipulates restrictions, tariffs, and the like for different classes of users concerning resource and function usage; and the global system policy includes, for example, a rule for resource allocation between multiple mobile customizable networks.

The access controlling unit 432 authenticates the user according to the authentication information stored in the subscription database, determines an access policy of the user according to the policy information stored in the policy database, and provides an ODMN enabler (enabler) 435 with an authentication result and the access policy of the user.

The access controlling unit 432 may execute the foregoing authentication and policy determination process when a network customization request or an operation request is received from the user. For example, the access controlling unit 432 authenticates an identity of the user who submits an access request, and checks whether the access request is within an authorized and permitted service scope. For another example, the access controlling unit 432 authenticates whether the user who puts forward the request is an authorized partner who has signed an agreement with an owner of the MBB network system 400, and whether the user has corresponding permission for a virtual-network or customized-network instance involved in the request.

In FIG. 4, the access controlling unit 432, the subscription database 433, and the policy database 434 are integrated in the capability opening layer 430. However, this embodiment of the present invention is not limited herein. The access controlling unit 432, the subscription database 433, and/or the policy database 434 may also serve as parts independent of the capability opening layer 430.

The ODMN enabler 435 is responsible for applying for, according to a network customization requirement after the authorization and authentication, an available network resource. The ODMN enabler 435 acquires an atomic-level control capability and forwarding capability from the atomic network capability managing unit 423, and combines the atomic-level control capability and forwarding capability according to the network customization request, so as to create, modify, or delete a customized-network instance. A created customized-network instance may be stored in a customized-network instance set 436. Each customized-network instance records information about a corresponding control capability and/or forwarding capability, and records a mutual relationship between these capabilities.

Specifically, the ODMN enabler 435 selects a required atomic-level control capability and forwarding capability according to the network customization request, sends a resource allocation request to the atomic network capability managing unit 423, receives a result of network resource allocation that is performed by the atomic network capability managing unit 423 according to the resource allocation request, and combines the selected atomic-level control capability and forwarding capability based on the result of the network resource allocation, so as to create, modify, or delete the customized-network instance. The network resource allocation process may further require participation of the forwarding control and network resource managing unit 421, the network application 422, the control resource agent 424, and the wireless access agent 412 or the forwarding agent 413.

In addition, the ODMN enabler 435 may include a monitoring unit 4351 or a configuring unit 4352. The monitoring unit 4351 is configured to execute status monitoring and fault detection of the customized-network instance. The configuring unit 4352 is configured to execute configuration management of the customized-network instance, such as, but not limited to, automatic management of a communication link and a virtual machine.

In this embodiment of the present invention, the mobile broadband network system can open its own network capabilities to a mobile application for the application to invoke, thereby helping further improve user experience for the mobile application and promote service innovation; and overall efficiency of a mobile network can also be improved, a new business model can be developed for a high-value application, and much more high added value, such as an invoking service benefiting from an open API, can be obtained beyond service traffic.

In addition, due to scarcity of wireless spectrum, a site, and a license and due to an ever-increasing cost, an operator has a strong requirement for sharing the wireless spectrum, the site, and the operating license. A virtual operation scenario and demand of a network become more common. It can be predicted that operator roles will be differentiated in future and their work will be segmented to give rise to dedicated infrastructure providers, virtual network providers, and virtual network operators. An infrastructure provider is specially responsible for building physical network facilities; a virtual network provider customizes resources from the infrastructure provider, and constructs a virtual network for a virtual network operator to use; and the virtual network operator focuses on network operation, and provides a mobile communications service to meet a requirement of an upper-layer mobile application for a mobile network. According to a requirement for virtual network operation, the mobile network must also have higher flexibility to meet an on-demand customization requirement.

The mobile broadband network system provided in this embodiment of the present invention is capable of implementing on-demand customization, and on a basis of a network architecture in which control and forwarding are decoupled, externally provides a programmable interface, and supports a requirement of an external application for customizing a network on demand. The mobile broadband network system according to this embodiment of the present invention has higher flexibility, and can meet the foregoing network customization requirement, thereby promoting innovation of an upper-layer mobile application, and helping an operator discover a high-value application, improve profitability of a network pipe, and obtain a competitive edge.

The following describes application examples of the MBB network systems in FIG. 1 to FIG. 4 with reference to specific embodiments. It should be noted that embodiments in FIG. 5 and FIG. 6 are merely intended to help a person skilled in the art more clearly understand an application manner of the MBB network systems provided in the embodiments of the present invention, rather than limiting the scope of the embodiments of the present invention.

Figure 5:
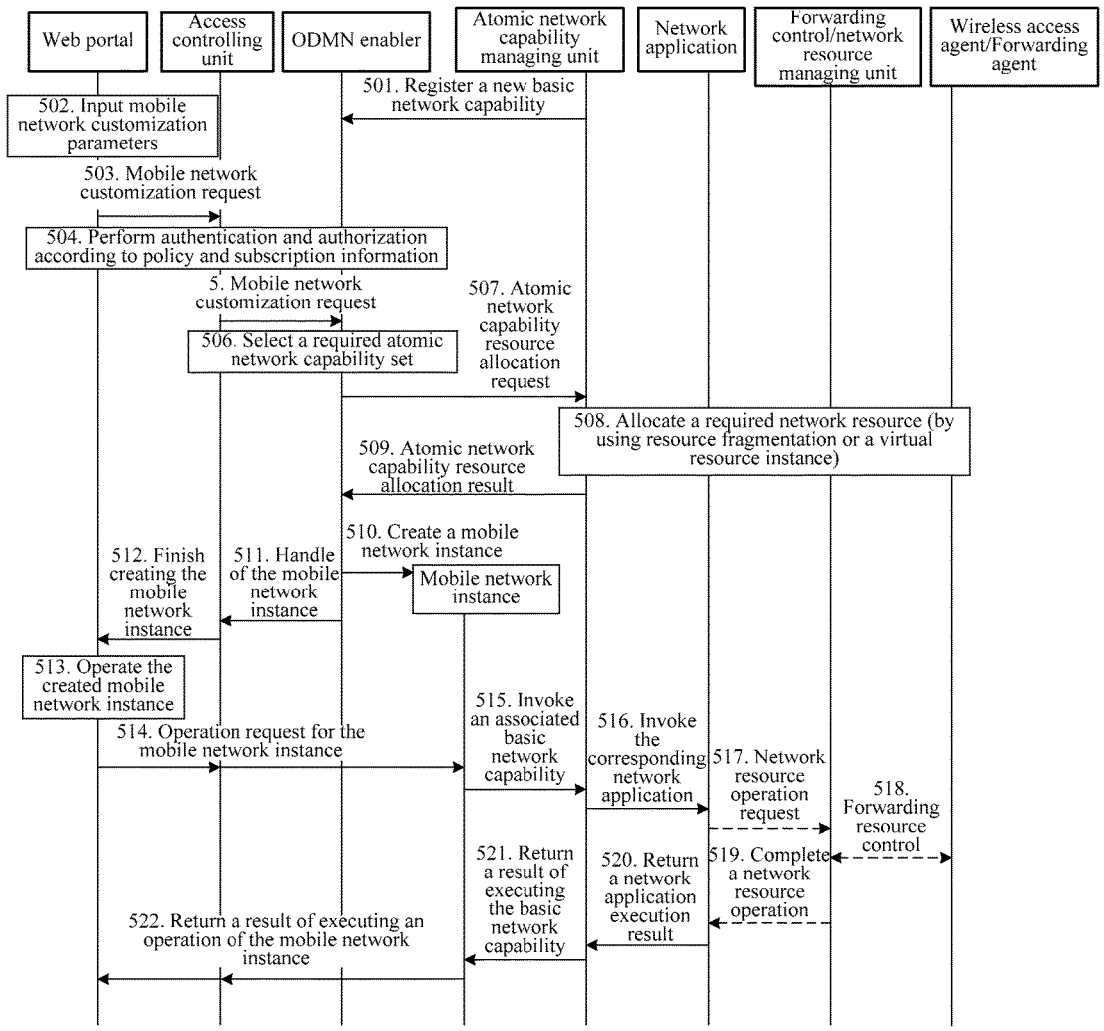
FIG. 5 is a schematic flowchart of a process of customizing a mobile broadband network on demand according to an embodiment of the present invention.
Figure 6:
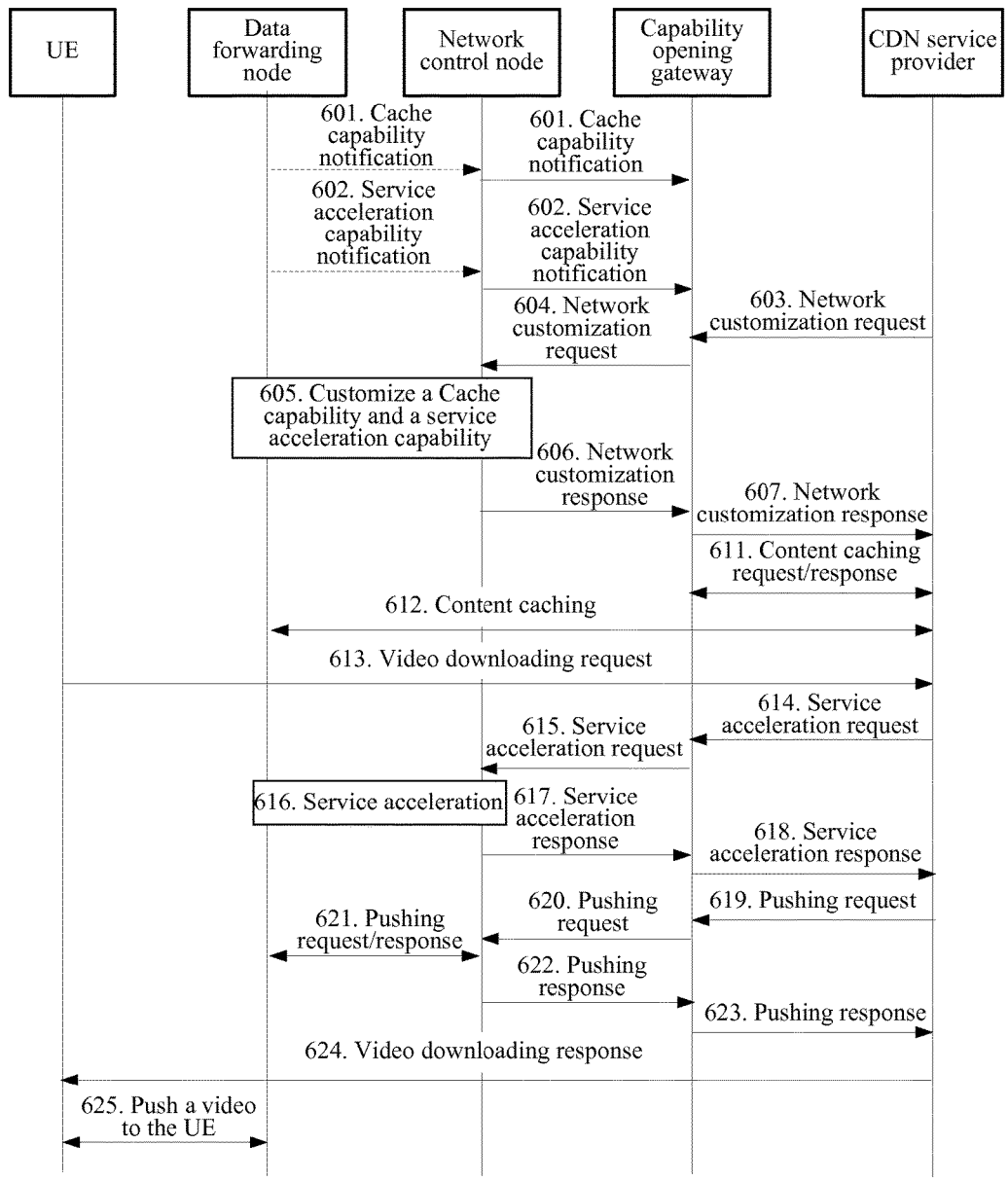
FIG. 6 is a schematic flowchart of a process of customizing a mobile broadband network on demand according to another embodiment of the present invention.

FIG. 5 is a schematic flowchart of a process of customizing a mobile broadband network on demand according to an embodiment of the present invention. For ease of understanding, an exemplary process in FIG. 5 is described with reference to the specific units in FIG. 4.

501. An atomic network capability managing unit registers a new basic network capability, including a forwarding capability of a forwarding layer or a control capability of a control layer, into an ODMN enabler.

The atomic network capability managing unit manages all network applications (such as a mobility management function, a user subscription information management function, a policy and charging management function, and a network topology resource management function) in the control layer, abstracts various types of functions into basic atomic capabilities, and provides an API or message interface that can be invoked for a local application program or a remote module to access. All new abstracted atomic capabilities need to be registered into the ODMN enabler, so that the ODMN enabler selects, according to a requirement, atomic capabilities based on all existing atomic capabilities, and combines the selected atomic capabilities into complex and complete network service capabilities.

502. Input a mobile network customization request on a Web portal page to create a customized-network instance. The mobile network customization request includes parameters required for customizing a mobile broadband network, such as an access type, a coverage scope, the maximum number of users, and a QoS parameter. This step may also be used to modify or delete an existing customized mobile network instance, and in this case, the request message also needs to carry a handle of the mobile network instance.

503. Submit the mobile network customization request to an access controlling unit.

504. The access controlling unit completes authentication and authorization of the mobile network customization request according to subscription information and policy database information.

505. Send the mobile network customization request that has passed the authentication and authorization to the ODMN enabler.

506. The ODMN enabler selects, according to the input network customization parameters, an atomic network capability set that is required for creating the network instance, and combines selected network capabilities into a required network function.

For example, if a 4G network is to be created, a mobility management atomic capability of a mobility management entity (MME, Mobility Management Entity), a policy and charging atomic capability of a PCRF, a gateway control atomic capability of a PGW-C, a gateway control atomic capability of an SGW-C, and an access control atomic capability of an eNodeB-C need to be selected.

For another example, if a 3G network is to be created, a mobility management atomic capability of an SGSN, a gateway control atomic capability of a GGSN-C, and a control atomic capability of an RNC may be selected.

In addition, in this embodiment of the present invention, because a control function and a forwarding function are decoupled for a gateway, the control function of the gateway, such as a processing part of a GTP-C, may be abstracted into a gateway control atomic capability, such as a PGW-C, an SGW-C, or a GGSN-C, and packet processing and forwarding of the gateway use a same GTP-U packet processing mechanism. Therefore, no matter whether a user customizes a 3G network or a 4G network, only different atomic capabilities of the control layer need to be customized to cooperate with a completely same forwarding layer, instead of customizing a forwarding layer that may be implemented by means of hardware, thereby significantly improving customization efficiency.

The foregoing is a request for creating a mobile network instance. For a request for modifying a mobile network instance, an operation of adding or deleting an atomic network capability to or from an existing atomic network capability set is further included. For a request for deleting a mobile network instance, step 510 is directly performed for deleting a requested mobile network instance.

507. The ODMN enabler sends a resource allocation request for an atomic network capability that is required by the customized mobile network to the atomic network capability managing unit of the control layer. The resource allocation request may include a network instance identifier, information about a service level agreement of a related user, and the like. If a certain atomic network capability needs to be deleted in steps 502 to 506, this step is to send a resource release request to the atomic network capability managing unit of the control layer.

508. The atomic network capability managing unit receives the resource allocation request for the atomic network capability, and allocates, according to the SLA information, a resource that meets an SLA requirement to the mobile network instance. If the resource allocation request is a request for deleting an atomic network capability resource, an occupied network resource is released.

A same atomic network capability may be simultaneously invoked by multiple network instances, causing contention for and collision of resources of a same category. To avoid such a case and implement independence and quality of service of resource invocation performed by different instances, the atomic network capability managing unit implements an atomic network capability virtualization function, that is, each kind of atomic network capabilities is virtualized into multiple same instances, where each virtual atomic network capability is separately invoked by different mobile network instances. SLA parameters, such as interface bandwidth, a forwarding rate, and an invoking priority, determine quality of service of use of a network resource that corresponds to a virtual atomic network capability. A method for implementing virtualization of the atomic network capabilities includes a resource fragmentation method or a resource virtualization instance method. In the so-called resource fragmentation method, all virtual atomic network capabilities share same network applications and forwarding resources, and each virtual instance occupies different resource space, such as an IP address segment, a flow entry range, or a port range; and in the so-called resource virtualization instance method, for each virtual atomic network capability, the atomic network capability managing unit creates an independent network application and forwarding instance, such as a virtual machine, which is logically completely isolated.

For example, if two 4G mobile network instances are created, for the resource fragmentation method, an MME atomic capability and a GW-C atomic capability in the two network instances share a same MME network application and GW-C network application. To differentiate two networks, different resource space, such as different TEID allocation space or different IP address segment allocation space, is allocated, in the MME network application and the GW-C network application, to a different network. A forwarding control and network resource managing unit further simultaneously maps, by using a wireless access agent and a forwarding agent, the resource space of the network applications in the control layer to different flow table space of forwarding and access resources. For the resource virtualization instance method, the control layer creates a corresponding virtual MME network application and a corresponding virtual GW-C network application for the MME atomic capability and the GW-C atomic capability in the two network instances respectively, so that the atomic capability in each network instance corresponds to the independent virtual network application. The required virtual network applications may be created in a virtual machine manner. The forwarding control and network resource managing unit further creates a virtual wireless access agent and forwarding agent that correspond to the virtual GW-C network application, so as to implement virtualization of the access resources and the forwarding resources.

509. The atomic network capability managing unit returns, to the ODMN enabler, an atomic network capability resource allocation result.

510. If all required atomic network capability resources in the requested mobile network instance are successfully allocated, the ODMN enabler creates a required customized mobile network instance that is obtained by combining the required atomic network capability set. If an existing mobile network instance is to be modified, the atomic network capability set in the mobile network instance is updated according to an addition or deletion operation. If an existing mobile network instance is to be deleted, network resources that are occupied by all atomic network functions included in the instance are released, and the mobile network instance is deleted.

511. The ODMN enabler returns a handle of the mobile network instance to the access controlling unit, so as to facilitate indexing for a subsequent operation of the mobile network instance.

512. The access controlling unit returns, to the Web portal, and displays a result indicating that the mobile network instance has been created.

513. The user performs, on the Web portal page, various resource or service operations for the customized-network instance, such as querying, modifying, or deleting end user information or a network resource.

514. The Web portal page submits an operation request of the user to the access controlling unit, where the operation request includes the handle of the mobile network instance. The access controlling unit forwards the operation request to the corresponding mobile network instance according to the handle of the mobile network instance.

515. The mobile network instance invokes an associated virtual atomic network capability from the atomic network capability managing unit according to an operation item.

516. The atomic network capability managing unit invokes, according to a received request, a network application that corresponds to the virtual atomic network capability.

517. If the foregoing operation involves an operation for a forwarding or access resource, the network application sends a corresponding network resource operation request to the forwarding control and network resource managing unit.

518. The forwarding control and network resource managing unit interacts with the wireless access agent and the forwarding agent according to the request, so as to implement the operation for the access or forwarding resources.

519. The forwarding control and network resource managing unit returns a network resource operation result to the network application.

520. The network application returns a network application execution result to the atomic network capability managing unit.

521. The atomic network capability managing unit returns a result of executing the virtual atomic network capability to the mobile network instance.

522. The mobile network instance returns a result of executing an operation of the network instance to the Web portal by using the access controlling unit.

In this way, on-demand customization of a mobile broadband network can be implemented. According to the embodiment in FIG. 5, virtual mobile broadband networks of different features and specifications may be customized, and according to this basic method, service may also be provided for an industrial application or enterprise, so as to customize dedicated mobile broadband networks required by these important customers.

FIG. 6 is a schematic flowchart of a process of customizing a mobile broadband network on demand according to another embodiment of the present invention. FIG. 6 is an example of a specific scenario in which a content delivery network (CDN, Content Delivery Network) service provider customizes a mobile broadband network. This embodiment is based on the implementation manner in FIG. 5.

It is assumed that a certain CDN service provider needs to construct a mobile broadband network dedicated for a CDN and supporting service acceleration. The service acceleration means that the mobile broadband network is capable of providing a service flow specified by the CDN service provider with a highest forwarding priority and a currently available maximum-bandwidth service, namely, a maximum-bandwidth service supported by the network and a terminal, so as to ensure optimal service experience for a high-priority user.

For brevity, an interaction process in FIG. 6 does not depict specific internal unit objects involved in each layer. However, a person skilled in the art can understand that the interaction process in FIG. 6 may be based on the process in FIG. 5, and implemented by the MBB network systems in FIG. 1 to FIG. 4.

601. A network control node (a control layer) abstracts a cache (Cache) capability of a forwarding layer, and registers the Cache capability into a capability opening gateway (a capability opening layer). The Cache capability is an atomic-level network capability of an MBB network.

The network control node may be configured with the Cache capability of the forwarding layer. In this case, a data forwarding node does not need to notify the network control node of the Cache capability, and therefore step 601 in FIG. 6 that is indicated by a dotted line does not need to be executed. Or a data forwarding node of the network sends a Cache capability notification to the network control node, to notify the network control node that the forwarding layer has the Cache capability, and in this case, step 601 in FIG. 6 that is indicated a dotted line needs to be executed.

602. The network control node abstracts a service acceleration capability, and registers the service acceleration capability into the capability opening gateway (the capability opening layer). The service acceleration capability is an atomic-level network capability of the MBB network.

Similarly, the network control node may be configured with the service acceleration capability of the forwarding layer. In this case, the data forwarding node does not need to notify the network control node of the service acceleration capability, and therefore step 602 in FIG. 6 that is indicated by a dotted line does not need to be executed. Or the data forwarding node of the network sends a service acceleration capability notification to the network control node, to notify the network control node that the forwarding layer has the service acceleration capability, and in this case, step 602 in FIG. 6 that is indicated by a dotted line needs to be executed.

603. The CDN service provider requests a customized network from a mobile operator, and sends a network customization request, which includes a Cache capacity (for example, applying for a 1000 GB Cache hard disk capacity) and a required service acceleration function, to the capability opening gateway.

604. The capability opening gateway authenticates the network customization request from the CDN service provider, and applies, to the network control node and according to a requirement, for customizing a corresponding resource and an atomic capability for service acceleration.

605. The network control node interacts and negotiates with the data forwarding node, so that the data forwarding node allocates the required Cache hard disk capacity, and loads and runs a capability plug-in that supports the service acceleration.

606. The network control node replies to the capability opening gateway with a network customization response.

607. The capability opening gateway replies to the CDN service provider with the network customization response.

The following steps 611 to 625 are a process in which the CDN service provider provides a customer of the CDN service provider with the service acceleration by using the foregoing dedicated mobile broadband network customized on demand.

611. The CDN service provider requests the mobile operator to cache video content onto a Cache hard disk allocated by the data forwarding node.

612. Cache the video content onto the Cache hard disk allocated by the data forwarding node.

613. A user equipment UE sends a video downloading request to the CDN service provider, so as to request downloading the video content.

614. The CDN service provider finds that acceleration processing is required for video downloading requested by the UE, and then the CDN service provider sends a service acceleration request to the capability opening gateway, so as to request video service acceleration processing.

615. The capability opening gateway sends the service acceleration request to the network control node, so as to request the video service acceleration processing.

616. The network control node interacts with the data forwarding node, so as to execute the video service acceleration processing. The network control node improves, according to an available bandwidth resource of the network, a terminal capability, and the received service acceleration request, a QoS parameter of a user bearer, such as a forwarding priority or maximum bandwidth. The data forwarding node executes the QoS parameter.

617. The network control node returns a service acceleration response to the capability opening gateway.

618. The capability opening gateway returns the service acceleration response to the CDN service provider.

619. If the CDN service provider finds that the video content requested by the UE is already cached in the Cache hard disk allocated by the data forwarding node, the CDN service provider sends a pushing request to the capability opening gateway, so as to request pushing the video content cached in the Cache hard disk to the UE.

620. The capability opening gateway sends the pushing request to the network control node, so as to request pushing the video content cached in the Cache hard disk to the UE.

621. The network control node sends the pushing request to the data forwarding node, so as to request pushing the video content cached in the Cache hard disk to the UE.

622. The network control node returns a pushing response to the capability opening gateway.

623. The capability opening gateway returns the pushing response to the CDN service provider.

624. The CDN service provider replies to the UE with a video downloading response.

625. The data forwarding node performs adaptation processing (such as coding and decoding) on the video content cached in the Cache hard disk, and then pushes processed video content to the UE.

In this embodiment of the present invention, a customizable mobile broadband network system is provided, thereby truly supporting a software-defined network. Because control and forwarding are decoupled, an operator can define a required network function and feature by merely modifying a software function of a centralized control plane, and can quickly customize a required mobile broadband network, including the required network function and required capacity specifications, over a shared network infrastructure by combining a virtualization and resource fragmentation technology.

Based on this embodiment of the present invention, an industrial user or a virtual network operator may, according to a business development requirement, quickly and flexibly create a customized network, and modify or release the customized network, so as to obtain support of a mobile network in a more economical and efficient manner without a need of considering basic construction or management of the mobile network; and can focus more on business operation and explore a high-value application and innovation to a maximum extent. In addition, an operator who provides a customizable mobile broadband network can also win over more high-value customers, obtain a more powerful competitive advantage, and maintain ability to gain profits from a mobile broadband network in the mobile Internet era.

Figure 7:
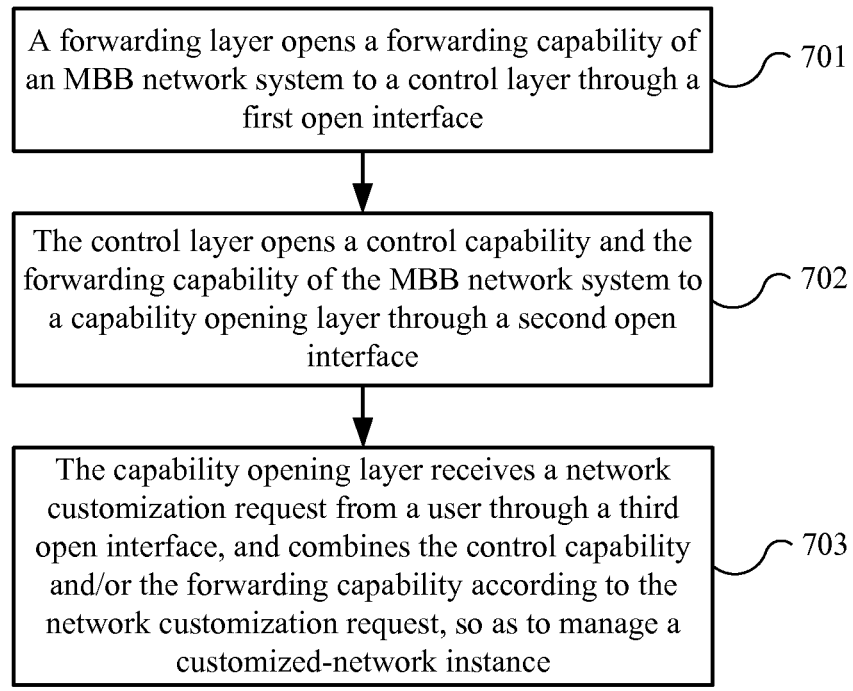
FIG. 7 is a flowchart of a method for customizing a mobile broadband network according to an embodiment of the present invention.

FIG. 7 is a flowchart of a method for customizing a mobile broadband network according to an embodiment of the present invention. The method in FIG. 7 may be executed by the MBB broadband network system 100, 300, or 400.

701. A forwarding layer opens a forwarding capability of an MBB network system to a control layer through a first open interface.

For example, the forwarding layer may abstract the forwarding capability, and notify the control layer of information about an abstracted forwarding capability, so that the control layer can invoke the forwarding capability. Optionally, as another embodiment, for example, in a case where the control layer is configured with the forwarding capability, the forwarding layer may not abstract the forwarding capability; instead, the control layer abstracts the forwarding capability.

702. The control layer opens a control capability and the forwarding capability of the MBB network system to a capability opening layer through a second open interface.

The control layer abstracts the control capability. In addition, the control layer may receive, from the forwarding layer, the information about the forwarding capability abstracted by the forwarding layer, or the control layer may locally abstract the forwarding capability. Then the control layer may register an abstracted control capability and the abstracted forwarding capability into the capability opening layer, thereby implementing opening of network capabilities (including a control capability and a forwarding capability) of the MBB network system to the capability opening layer. Optionally, the control layer may implement the opening of the network capabilities to the capability opening layer in a capability plug-in manner.

703. The capability opening layer receives a network customization request from a user through a third open interface, and combines the control capability and/or the forwarding capability according to the network customization request, so as to manage a customized-network instance.

Management of the customized-network instance includes creation, deletion, and/or modification of the customized-network instance. Optionally, the network customization request may include parameters of the customized-network instance that are input by the user; and the capability opening layer selects an appropriate control capability and/or forwarding capability according to these parameters, and applies for a corresponding network resource (such as an access resource, a forwarding resource, or a control resource), so as to create, delete, or modify the customized-network instance.

In this embodiment of the present invention, a forwarding capability and a control capability of a mobile broadband network system are decoupled from each other, provided by a forwarding layer and a control layer respectively, and opened to a capability opening layer. The capability opening layer combines a required capability according to a network customization request, so as to manage a corresponding customized-network instance. Therefore, according to the mobile broadband network system in this embodiment of the present invention, a mobile network can be customized according to a requirement of a user, thereby implementing a comprehensive and flexible mobile network architecture.

The method for customizing a mobile broadband network according to this embodiment of the present invention may be implemented by the modules of the MBB network systems in FIG. 1 to FIG. 4, and may be implemented according to the specific examples in FIG. 5 and FIG. 6. To avoid repetition, no further details are provided herein.

For example, for a process of creating the customized-network instance, reference may be made to steps 501 to 512 in FIG. 5 and steps 601 to 607 in FIG. 6.

For example, as another embodiment, the capability opening layer may receive an operation request of the user for the customized-network instance through the third open interface, the customized-network instance invokes a corresponding forwarding capability and/or control capability and a corresponding network resource according to the operation request, so as to complete a requested operation, and the capability opening layer may return an operation result to the user through the third open interface. For example, for a process of operating the customized-network instance, reference may be made to steps 513 to 522 in FIG. 5 and steps 611 to 625 in FIG. 6. In this way, the user can perform a service operation by using the created customized-network instance.

Optionally, as an embodiment, in step 701, the forwarding layer may abstract the forwarding capability of the forwarding layer, and provide a forwarding control/resource management sublayer of the control layer with information about an abstracted forwarding capability through the first open interface.

Optionally, as another embodiment, in step 702, the control layer may abstract the forwarding capability of the forwarding layer and the control capability of the control layer to obtain an atomic-level forwarding capability and control capability, and open the atomic-level control capability and forwarding capability to the capability opening layer through the second open interface.

Optionally, as another embodiment, in step 703, the capability opening layer may acquire the atomic-level control capability and forwarding capability from the control layer, and combine the atomic-level control capability and forwarding capability according to the network customization request, so as to create, modify, or delete the customized-network instance.

Figure 8:
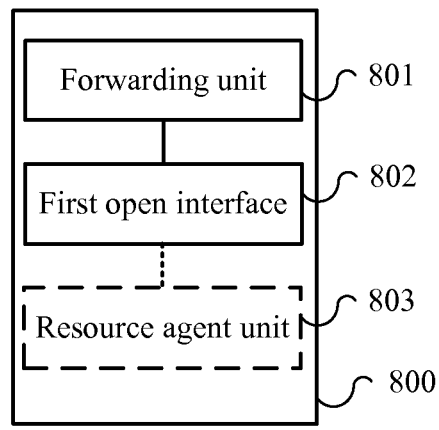
FIG. 8 is a block diagram of a forwarding layer device in a customizable mobile broadband network system according to an embodiment of the present invention.

FIG. 8 is a block diagram of a forwarding layer device in a customizable mobile broadband network system according to an embodiment of the present invention. A forwarding layer device 800 in FIG. 8 is an entity that implements the forwarding layer 101 in FIG. 1, and includes a forwarding unit 801 and a first open interface 802.

The forwarding unit 801 provides a forwarding capability of the mobile broadband network system. The first open interface 802 connects to a control layer device of the mobile broadband network system, and opens the forwarding capability of the forwarding unit 801 to the control layer device.

In this embodiment of the present invention, a forwarding capability and a control capacity of a mobile broadband network system are decoupled from each other, and a forwarding layer comprehensively opens a forwarding capability. Therefore, according to the mobile broadband network system in this embodiment of the present invention, a mobile network can be customized according to a requirement of a user, thereby implementing a comprehensive and flexible mobile network architecture.

The forwarding layer device 800 is capable of performing various operations related to the forwarding layer in the foregoing embodiments. To avoid repetition, no further details are provided herein.

Optionally, as an embodiment, the forwarding layer device 800 further includes a resource agent unit 803, configured to manage access resources and forwarding resources of the forwarding layer device 800, and provide the control layer device with information about the access resources and the forwarding resources.

Optionally, as another embodiment, the forwarding unit 801 may abstract the forwarding capability, and provide the control layer device with information about an abstracted forwarding capability through the first open interface.

Optionally, as another embodiment, the forwarding layer device 800 may include a network forwarding node or a network switching node of the mobile broadband network system. An example of the network forwarding node or the network switching node includes a forwarding function part of a wireless base station, a forwarding function part of a core network gateway, or the like.

Figure 9:
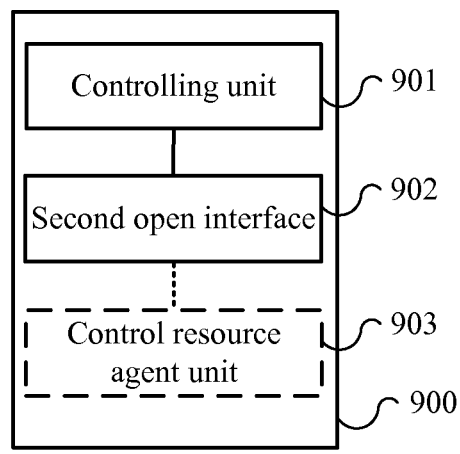
FIG. 9 is a block diagram of a control layer device in a customizable mobile broadband network system according to an embodiment of the present invention.

FIG. 9 is a block diagram of a control layer device in a customizable mobile broadband network system according to an embodiment of the present invention. A control layer device 900 in FIG. 9 is an entity that implements the control layer 102 in FIG. 1, and includes a controlling unit 901 and a second open interface 902.

The controlling unit 901 receives, from a forwarding layer device of the mobile broadband network system, information about a forwarding capability of the forwarding layer device through a first open interface, and provides a control capability of the mobile broadband network system.

The second open interface 902 connects to a capability opening layer device of the mobile broadband network system, and opens the control capability and the forwarding capability to the capability opening layer device.

In this embodiment of the present invention, a forwarding capability and a control capacity of a mobile broadband network system are decoupled from each other, and a control layer comprehensively opens a control capability. Therefore, according to the mobile broadband network system in this embodiment of the present invention, a mobile network can be customized according to a requirement of a user, thereby implementing a comprehensive and flexible mobile network architecture.

The control layer device 900 is capable of performing various operations related to the control layer in the foregoing embodiments. To avoid repetition, no further details are provided herein.

Optionally, as an embodiment, the controlling unit 901 is further configured to interact, through the first open interface, with the forwarding layer device, so as to control a forwarding operation of the forwarding layer device.

Optionally, as another embodiment, the control layer device 900 further includes a control resource agent unit 903, configured to manage control resources of the control layer device 900, and provide the capability opening layer device with information about the control resources.

Optionally, as another embodiment, the controlling unit 901 includes one or more network applications, where each network application implements a specific control capability.

Optionally, as another embodiment, the controlling unit 901 abstracts the forwarding capability of the forwarding layer device and the control capability of the control layer device to obtain an atomic-level forwarding capability and control capability, and the second open interface 902 opens the atomic-level control capability and forwarding capability to the capability opening layer device.

Optionally, as another embodiment, the control layer device 900 includes a network control node of the mobile broadband network system. An example of the network control node includes a control function part of a mobility management network element, a control function part of a base station controller, a control function part of a gateway, or the like.

Figure 10:
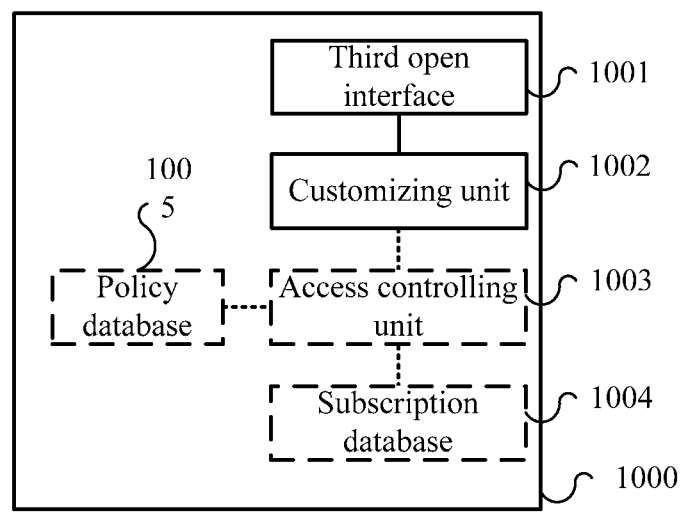
FIG. 10 is a block diagram of a capability opening layer device in a customizable mobile broadband network system according to an embodiment of the present invention.

FIG. 10 is a block diagram of a capability opening layer device in a customizable mobile broadband network system according to an embodiment of the present invention. A capability opening layer device 1000 in FIG. 10 is an entity that implements the capability opening layer 103 in FIG. 1, and includes a third open interface 1001 and a customizing unit 1002.

The third open interface 1001 receives a network customization request from a user. The customizing unit 1002 combines a control capability and/or a forwarding capability according to the network customization request, so as to manage a customized-network instance.

In this embodiment of the present invention, a forwarding capability and a control capability of a mobile broadband network system are decoupled from each other, provided by a forwarding layer and a control layer respectively, and opened to a capability opening layer. The capability opening layer combines a required capability according to a network customization request, so as to manage a corresponding customized-network instance. Therefore, according to the mobile broadband network system in this embodiment of the present invention, a mobile network can be customized according to a requirement of a user, thereby implementing a comprehensive and flexible mobile network architecture.

The capability opening layer device 1000 is capable of performing various operations related to the capability opening layer in the foregoing embodiments. To avoid repetition, no further details are provided herein.

Optionally, as an embodiment, the customizing unit 1002 is further configured to receive, through the second open interface, information about network resources of the mobile broadband network system from a control layer device of the mobile broadband network system, and manage the network resources of the customized network according to the information about the network resources. The network resources may include control resources of the control layer device, access resources and forwarding resources of a forwarding layer device, and the like.

Optionally, as another embodiment, the customizing unit 1002 may acquire an atomic-level control capability and forwarding capability from the control layer device through the second open interface, and combine the atomic-level control capability and forwarding capability according to the network customization request, so as to create, modify, or delete the customized-network instance.

Optionally, as another embodiment, the customizing unit 1002 may further execute status monitoring and fault detection of the customized-network instance; or is configured to execute configuration management of the customized-network instance.

Optionally, as another embodiment, the capability opening layer device 1000 further includes an access controlling unit 1003, a subscription database 1004, and a policy database 1005. The subscription database 1004 is configured to store and manage authentication information of the user; the policy database 1005 is configured to store and manage capability opening and customized policy information of the user; and the access controlling unit 1003 is configured to authenticate the user according to the authentication information stored in the subscription database 1004, determine an access policy of the user according to the policy information stored in the policy database 1005, and provide the customizing unit with an authentication result and the access policy of the user.

Optionally, as another embodiment, the third open interface 1001 includes a Web interface and/or an application programming interface.

Optionally, as another embodiment, the third open interface 1001 may further receive an operation request of the user for the customized-network instance, the customized-network instance invokes a corresponding forwarding capability and/or control capability and a corresponding network resource according to the operation request, so as to complete a requested operation, and the third open interface 1001 returns an operation result to the user.

Optionally, as another embodiment, the third open interface 1001 may further provide the user with an operation handle of the customized-network instance; and the customized-network instance invokes the corresponding forwarding capability and/or control capability and the corresponding network resource according to the operation handle included in the operation request, so as to complete the requested operation.

Optionally, as another embodiment, the capability opening layer device 1000 includes a capability opening node or a capability opening gateway of the mobile broadband network system. The capability opening node or the capability opening gateway may be a node device disposed separately, or may also be integrated in any network element, for example, integrated in a gateway.

Figure 11:
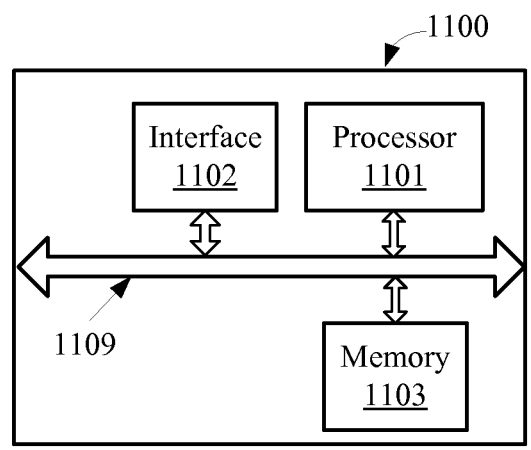
FIG. 11 is a block diagram of a forwarding layer device in a customizable mobile broadband network system according to another embodiment of the present invention.

FIG. 11 is a block diagram of a forwarding layer device in a customizable mobile broadband network system according to an embodiment of the present invention. A forwarding layer device 1100 in FIG. 11 is an entity that implements the forwarding layer 101 in FIG. 1, and includes a processor 1101 and an interface 1102.

The processor 1101 provides a forwarding capability of the mobile broadband network system. The interface 1102 connects to a control layer device of the mobile broadband network system, and opens the forwarding capability to the control layer device. An example of the interface 1102 is the first open interface.

In this embodiment of the present invention, a forwarding capability and a control capacity of a mobile broadband network system are decoupled from each other, and a forwarding layer comprehensively opens a forwarding capability. Therefore, according to the mobile broadband network system in this embodiment of the present invention, a mobile network can be customized according to a requirement of a user, thereby implementing a comprehensive and flexible mobile network architecture.

The forwarding layer device 1100 further includes a memory 1103. Various components of the forwarding layer device 1100 are coupled together by using a bus system 1109. The bus system 1109 further includes a power bus, a control bus, and a status signal bus, in addition to a data bus. However, for clear description, all buses in the figure are marked as the bus system 1109.

The methods disclosed in the foregoing embodiments of the present invention may be applied to the processor 1101, or implemented by the processor 1101. The processor 1101 may be an integrated circuit chip, and has a signal processing capability. During an implementation process, various steps in the foregoing methods may be completed by an integrated logic circuit of hardware in the processor 1101 or by an instruction in a software form. The processor 1101 may be a general processor, a digital signal processor (DSP), an application-specific integrated circuit (ASIC), a field programmable gate array (FPGA) or another programmable logic device, a discrete gate or transistor logic device, or a discrete hardware component; and is capable of implementing or executing the methods, steps, and logical block diagrams disclosed in the embodiments of the present invention. The general processor may be a microprocessor, or the processor may also be any conventional processor or the like. The steps of the methods disclosed in the embodiments of the present invention may be directly embodied as being executed by a hardware decoding processor, or executed by a combination of hardware of a decoding processor and a software module. The software module may be located in a mature storage medium in the art, such as a random access memory, a flash memory, a read-only memory, a programmable read-only memory or an electrically erasable programmable memory, or a register. The storage medium is located in the memory 1103. The processor 1101 reads information in the memory 1103, and completes the steps of the methods by combining hardware of the processor. For example, the memory 1103 may cache data that needs to be forwarded, or store a forwarding-related program instruction, and the like.

The forwarding layer device 1100 is capable of implementing various processes executed by the forwarding layer in the foregoing embodiments. To avoid repetition, no further details are provided herein.

Optionally, as an embodiment, the processor 1101 may be further configured to manage access resources and forwarding resources of the forwarding layer device 1100, and provide the control layer device with information about the access resources and the forwarding resources.

Optionally, as another embodiment, the processor 1101 may abstract the forwarding capability, and provide the control layer device with information about an abstracted forwarding capability through the interface 1102.

Optionally, as another embodiment, the forwarding layer device 1100 may be implemented as a network forwarding node or a network switching node of the mobile broadband network system. An example of the network forwarding node or the network switching node includes a forwarding function part of a wireless base station, a forwarding function part of a core network gateway, or the like.

Figure 12:
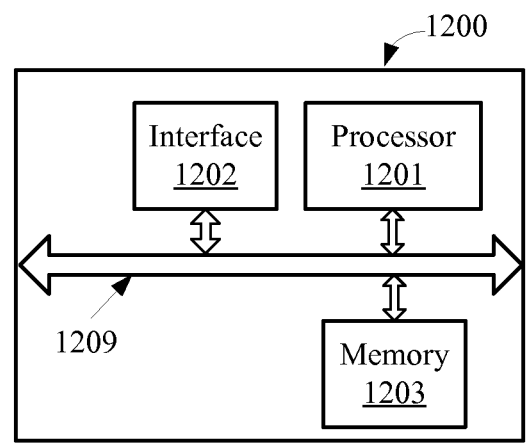
FIG. 12 is a block diagram of a control layer device in a customizable mobile broadband network system according to another embodiment of the present invention.

FIG. 12 is a block diagram of a control layer device in a customizable mobile broadband network system according to an embodiment of the present invention. A control layer device 1200 in FIG. 12 is an entity that implements the control layer 102 in FIG. 1, and includes a processor 1201 and an interface 1202.

The processor 1201 provides a control capability of the mobile broadband network system. The interface 1202 receives, from a forwarding layer device of the mobile broadband network system, information about a forwarding capability of the forwarding layer device. The interface 1202 further connects to a capability opening layer device of the mobile broadband network system, and opens the control capability and the forwarding capability to the capability opening layer device.

An example of the interface 1202 includes an interface that corresponds to the first open interface, and the second open interface.

In this embodiment of the present invention, a forwarding capability and a control capacity of a mobile broadband network system are decoupled from each other, and a control layer comprehensively opens a control capability. Therefore, according to the mobile broadband network system in this embodiment of the present invention, a mobile network can be customized according to a requirement of a user, thereby implementing a comprehensive and flexible mobile network architecture.

The control layer device 1200 further includes a memory 1203. Various components of the control layer device 1200 are coupled together by using a bus system 1209. The bus system 1209 further includes a power bus, a control bus, and a status signal bus, in addition to a data bus. However, for clear description, all buses in the figure are marked as the bus system 1209.

The methods disclosed in the foregoing embodiments of the present invention may be applied to the processor 1201, or implemented by the processor 1201. The processor 1201 may be an integrated circuit chip, and has a signal processing capability. During an implementation process, various steps in the foregoing methods may be completed by an integrated logic circuit of hardware in the processor 1201 or by an instruction in a software form. The processor 1201 may be a general processor, a digital signal processor (DSP), an application-specific integrated circuit (ASIC), a field programmable gate array (FPGA) or another programmable logic device, a discrete gate or transistor logic device, or a discrete hardware component, and is capable of implementing or executing the methods, steps, and logical block diagrams disclosed in the embodiments of the present invention. The general processor may be a microprocessor, or the processor may also be any conventional processor or the like. The steps of the methods disclosed in the embodiments of the present invention may be directly embodied as being executed by a hardware decoding processor, or executed by a combination of hardware of a decoding processor and a software module. The software module may be located in a mature storage medium in the art, such as a random access memory, a flash memory, a read-only memory, a programmable read-only memory or an electrically erasable programmable memory, or a register. The storage medium is located in the memory 1203. The processor 1201 reads information in the memory 1203, and completes the steps of the methods by combining hardware of the processor. For example, the memory 1203 may store control-related signaling or data, and the like.

The control layer device 1200 is capable of implementing various processes executed by the control layer in the foregoing embodiments. To avoid repetition, no further details are provided herein.

Optionally, as an embodiment, the processor 1201 may further interact with the forwarding layer device, so as to control a forwarding operation of the forwarding layer device.

Optionally, as another embodiment, the processor 1201 may further manage control resources of the control layer device 1200, and provide the capability opening layer device with information about the control resources.

Optionally, as another embodiment, the processor 1201 may further support one or more network applications, where each network application implements a specific control capability.

Optionally, as another embodiment, the processor 1201 may further abstract the forwarding capability of the forwarding layer device and the control capability of the control layer device to obtain an atomic-level forwarding capability and control capability, and the interface 1202 opens the atomic-level control capability and forwarding capability to the capability opening layer device.

Optionally, as another embodiment, the control layer device 1200 may be implemented as a network control node of the mobile broadband network system. An example of the network control node includes a control function part of a mobility management network element, a control function part of a base station controller, a control function part of a gateway, or the like.

Figure 13:
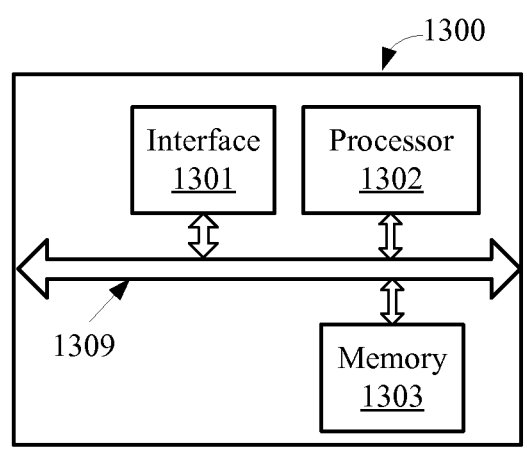
FIG. 13 is a block diagram of a capability opening layer device in a customizable mobile broadband network system according to another embodiment of the present invention.

FIG. 13 is a block diagram of a capability opening layer device in a customizable mobile broadband network system according to an embodiment of the present invention. A capability opening layer device 1300 in FIG. 13 is an entity that implements the capability opening layer 133 in FIG. 1, and includes an interface 1301 and a processor 1302.

The interface 1301 receives a network customization request from a user. The processor 1302 combines a control capability and/or a forwarding capability according to the network customization request, so as to manage a customized-network instance.

An example of the interface 1301 includes an interface that corresponds to the second open interface, and the third open interface.

In this embodiment of the present invention, a forwarding capability and a control capability of a mobile broadband network system are decoupled from each other, provided by a forwarding layer and a control layer respectively, and opened to a capability opening layer. The capability opening layer combines a required capability according to a network customization request, so as to manage a corresponding customized-network instance. Therefore, according to the mobile broadband network system in this embodiment of the present invention, a mobile network can be customized according to a requirement of a user, thereby implementing a comprehensive and flexible mobile network architecture.

The capability opening layer device 1300 further includes a memory 1303. Various components of the capability opening layer device 1300 are coupled together by using a bus system 1309. The bus system 1309 further includes a power bus, a control bus, and a status signal bus, in addition to a data bus. However, for clear description, all buses in the figure are marked as the bus system 1309.

The methods disclosed in the foregoing embodiments of the present invention may be applied to the processor 1302, or implemented by the processor 1302. The processor 1302 may be an integrated circuit chip, and has a signal processing capability. During an implementation process, various steps in the foregoing methods may be completed by an integrated logic circuit of hardware in the processor 1302 or by an instruction in a software form. The processor 1302 may be a general processor, a digital signal processor (DSP), an application-specific integrated circuit (ASIC), a field programmable gate array (FPGA) or another programmable logic device, a discrete gate or transistor logic device, or a discrete hardware component, and is capable of implementing or executing the methods, steps, and logical block diagrams disclosed in the embodiments of the present invention. The general processor may be a microprocessor, or the processor may also be any conventional processor or the like. The steps of the methods disclosed in the embodiments of the present invention may be directly embodied as being executed by a hardware decoding processor, or executed by a combination of hardware of a decoding processor and a software module. The software module may be located in a mature storage medium in the art, such as a random access memory, a flash memory, a read-only memory, a programmable read-only memory or an electrically erasable programmable memory, or a register. The storage medium is located in the memory 1303. The processor 1302 reads information in the memory 1303, and completes the steps of the methods by combining hardware of the processor. For example, the memory 1303 may store related information of the customized-network instance.

The capability opening layer device 1300 is capable of implementing various processes executed by the capability opening layer in the foregoing embodiments. To avoid repetition, no further details are provided herein.

Optionally, as an embodiment, the processor 1302 is further configured to receive, through the second open interface, information about network resources of the mobile broadband network system from a control layer device of the mobile broadband network system, and manage the network resources of the customized network according to the information about the network resources. The network resources may include control resources of the control layer device, access resources and forwarding resources of a forwarding layer device, and the like.

Optionally, as another embodiment, the processor 1302 may acquire an atomic-level control capability and forwarding capability from the control layer device through the interface 1301, and combine the atomic-level control capability and forwarding capability according to the network customization request, so as to create, modify, or delete the customized-network instance.

Optionally, as another embodiment, the processor 1302 may further execute status monitoring and fault detection of the customized-network instance; or is configured to execute configuration management of the customized-network instance.

Optionally, as another embodiment, the memory 1303 may further store a subscription database and a policy database. The subscription database is configured to store and manage authentication information of the user. The policy database is configured to store and manage capability opening and customized policy information of the user. The processor 1302 may authenticate the user according to the authentication information stored in the subscription database, determine an access policy of the user according to the policy information stored in the policy database, and provide a customizing unit with an authentication result and the access policy of the user.

Optionally, as another embodiment, the interface 1301 may include a Web interface and/or an application programming interface.

Optionally, as another embodiment, the interface 1301 may further receive an operation request of the user for the customized-network instance, the customized-network instance invokes a corresponding forwarding capability and/or control capability and a corresponding network resource according to the operation request, so as to complete a requested operation, and the interface 1301 returns an operation result to the user.

Optionally, as another embodiment, the interface 1301 may further provide the user with an operation handle of the customized-network instance, and the customized-network instance invokes the corresponding forwarding capability and/or control capability and the corresponding network resource according to the operation handle included in the operation request, so as to complete the requested operation.

Optionally, as another embodiment, the capability opening layer device 1300 may be implemented as a capability opening node or a capability opening gateway of the mobile broadband network system. The capability opening node or the capability opening gateway may be a node device disposed separately, or may also be integrated in any network element, for example, integrated in a gateway.

A person of ordinary skill in the art may be aware that, in combination with the examples described in the embodiments disclosed in this specification, units and algorithm steps may be implemented by electronic hardware, or a combination of computer software and electronic hardware. Whether the functions are executed by hardware or software depends on particular applications and design constraint conditions of the technical solutions. A person skilled in the art may use different methods to implement the described functions for each particular application, but it should not be considered that the implementation goes beyond the scope of the present invention.

A person skilled in the art may clearly understand that, for convenient and brief description, for a detailed working process of the foregoing system, apparatuses, and units, reference may be made to a corresponding process in the foregoing method embodiments, and details are not described herein again.

In the several embodiments provided in the present application, it should be understood that the disclosed system, apparatuses, and method may be implemented in other manners. For example, the described apparatus embodiments are merely exemplary. For example, the unit dividing is merely logical function dividing, and there may be other dividing manners in actual implementation. For example, a plurality of units or components may be combined or integrated into another system, or some features may be ignored or not executed. In addition, the shown or discussed mutual couplings, direct couplings, or communication connections may be implemented through some interfaces. The indirect couplings or communication connections between the apparatuses or units may be electrical, mechanical, or in other forms.

The units described as separate parts may or may not be physically separated, and the parts shown as units may or may not be physical units, that is, may be located in one position, or may also be distributed on a plurality of network units. A part of or all of the units may be selected according to actual needs to achieve the objectives of the solutions of the embodiments.

In addition, functional units in the embodiments of the present invention may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A customizable mobile broadband network system, comprising at least one processor and non-transitory, computer readable memory storing instructions for execution by the processor so as to configure the processor to provide a forwarding layer, a control layer, and a capability opening layer, wherein (a) the forwarding layer connects to the control layer through a first open interface, and provides a forwarding capability of the mobile broadband network system, wherein the first open interface opens the forwarding capability to the control layer;

(b) the control layer connects to the capability opening layer through a second open interface, and provides a control capability of the mobile broadband network system, wherein the second open interface opens the control capability and the forwarding capability to the capability opening layer; and (c) the capability opening layer receives, through a third open interface, a network customization request from a user, and combine at least one of the control capability and the forwarding capability according to the network customization request, so as to manage a customized-network instance; and the processor is further configured to provide an on-demand mobile network enabler of the capability opening layer that (a) selects a required atomic-level control capability and forwarding capability according to the network customization request, (b) sends a resource allocation request to a capability abstraction sublayer of the control layer, (c) receives a result of network resource allocation that is performed by the capability abstraction sublayer according to the resource allocation request, and (d) combines the selected atomic-level control capability and forwarding capability based on the result of the network resource allocation, so as to create, modify, or delete the customized-network instance;

wherein the capability abstraction sublayer is configured to abstract the forwarding capability of the forwarding layer and the control capability of the control layer to obtain an atomic-level forwarding capability and control capability, and open the atomic-level control capability and forwarding capability to the capability opening layer through the second open interface.

2. The mobile broadband network system according to claim 1, wherein the control layer further comprises a forwarding control or resource management sublayer, configured to interact with the forwarding layer through the first open interface, so as to control a forwarding operation of the forwarding layer.

3. The mobile broadband network system according to claim 2, wherein the forwarding layer further comprises a forwarding capability abstraction or resource agent sublayer, configured to manage access resources and forwarding resources of the forwarding layer.

4. The mobile broadband network system according to claim 3, wherein the forwarding capability abstraction/resource agent sublayer is further configured to abstract the forwarding capability of the forwarding layer, and provide the forwarding control or resource management sublayer of the control layer with information about an abstracted forwarding capability through the first open interface.

5. The mobile broadband network system according to claim 3, wherein the control layer further comprises a control resource agent, configured to manage control resources of the control layer.

6. The mobile broadband network system according to claim 5, wherein the forwarding capability abstraction or resource agent sublayer is further configured to provide the forwarding control or resource management sublayer with information about the access resources and the forwarding resources;

the control resource agent is further configured to provide the forwarding control/resource management sublayer with information about the control resources; and the forwarding control/resource management sublayer is further configured to manage network resources of the customized network according to the information about the access resources and the forwarding resources and the information about the control resources.

7. The mobile broadband network system according to claim 6, wherein the control layer further comprises a network application sublayer, the network application sublayer comprises one or more network applications, and each of the network applications implements a control capability.

8. The mobile broadband network system according to claim 1, wherein the capability abstraction sublayer opens the atomic-level control capability.

9. The mobile broadband network system according to claim 1, wherein the on-demand mobile network enabler is further configured to:

execute status monitoring and fault detection of the customized-network instance; or execute configuration management of the customized-network instance.

10. The mobile broadband network system according to claim 1, further comprising an access controller, a subscription database, and a policy database, wherein:

the subscription database is configured to store and manage authentication information of the user;

the policy database is configured to store and manage capability opening and customized policy information of the user; and the access controller is configured to authenticate the user according to the authentication information stored in the subscription database, determine an access policy of the user according to the policy information stored in the policy database, and provide the on-demand mobile network enabler with an authentication result and the access policy of the user.

11. The mobile broadband network system according to claim 10, wherein at least one of the access controller, the subscription database, and the policy database are integrated in the capability opening layer.

12. The mobile broadband network system according to claim 1, wherein the third open interface comprises at least one of a Web interface and an application programming interface.

13. The mobile broadband network system according to claim 1, wherein the capability opening layer is further configured to provide, through the third open interface, the user with an operation interface of the customized-network instance;

the capability opening layer is configured to receive, through the third open interface, an operation request of the user for the customized-network instance, the customized-network instance invokes at least one of (a) a corresponding forwarding capability and (b) a corresponding control capability, and a corresponding network resource according to the operation request, so as to complete a requested operation, and the capability opening layer returns an operation result to the user through the third open interface.

14. A method for customizing a mobile broadband network comprising:

opening, by a forwarding layer, a forwarding capability of a mobile broadband network system to a control layer through a first open interface;

opening, by the control layer, a control capability and the forwarding capability of the mobile broadband network system to a capability opening layer through a second open interface, wherein the control layer further comprises a capability abstraction sublayer, configured to abstract the forwarding capability of the forwarding layer and the control capability of the control layer to obtain an atomic-level forwarding capability and control capability, and open the atomic-level control capability and forwarding capability to the capability opening layer through the second open interface; and receiving, by the capability opening layer, a network customization request from a user through a third open interface, and combining at least one of the control capability and the forwarding capability according to the network customization request, so as to manage a customized-network instance, wherein in combining at least one of the control capability and the forwarding capability according to the network customization request, so as to manage a customized-network instance, an on-demand mobile network enabler of the capability opening layer is configured to (a) select a required atomic-level control capability and forwarding capability according to the network customization request, (b) send a resource allocation request to a capability abstraction sublayer of the control layer, (c) receive a result of network resource allocation that is performed by the capability abstraction sublayer according to the resource allocation request, and (d) combine the selected atomic-level control capability and forwarding capability based on the result of the network resource allocation, so as to create, modify, or delete the customized-network instance.

15. A control layer device in a customizable mobile broadband network system, the device comprising:

a controller, configured to receive, from a forwarding layer device of the mobile broadband network system, information about a forwarding capability of the forwarding layer device, and provide a control capability of the mobile broadband network system; and a second open interface, configured to connect to a capability opening layer device of the mobile broadband network system, and open the control capability and the forwarding capability to the capability opening layer device;

wherein the control layer device further comprises a capability abstraction sublayer, configured to abstract the forwarding capability of the forwarding layer and the control capability of the control layer to obtain an atomic-level forwarding capability and control capability, and open the atomic-level control capability and forwarding capability to the capability opening layer through the second open interface;

an on-demand mobile network enabler of the capability opening layer device is configured to (a) select a required atomic-level control capability and forwarding capability according to the network customization request, (b) send a resource allocation request to a capability abstraction sublayer of the control layer device, (c) receive a result of network resource allocation that is performed by the capability abstraction sublayer according to the resource allocation request, and (d) combine the selected atomic-level control capability and forwarding capability based on the result of the network resource allocation, so as to create, modify, or delete the customized-network instance.

16. A capability opening layer device in a customizable mobile broadband network system, the device comprising:

a third open interface, configured to receive a network customization request from a user; and a customizing device, configured to combine at least one of a control capability and a forwarding capability according to the network customization request, so as to manage a customized-network instance;

in combining at least one of the control capability and the forwarding capability according to the network customization request, so as to manage a customized-network instance, an on-demand mobile network enabler, configured to select a required atomic-level control capability and forwarding capability according to the network customization request, send a resource allocation request to a capability abstraction sublayer of a control layer device, receive a result of network resource allocation that is performed by the capability abstraction sublayer according to the resource allocation request, and combine the selected atomic-level control capability and forwarding capability based on the result of the network resource allocation, so as to create, modify, or delete the customized-network instance.

17. A customizable mobile broadband network system, comprising a forwarding layer, a control layer, and a capability opening layer, wherein:

the forwarding layer connects to the control layer through a first open interface, the control layer connects to the capability opening layer through a second open interface, wherein the control layer further comprises a capability abstraction sublayer, configured to abstract the forwarding capability of the forwarding layer and the control capability of the control layer to obtain an atomic-level forwarding capability and control capability, and open the atomic-level control capability and forwarding capability to the capability opening layer through the second open interface, the capability opening layer is configured to receive, through a third open interface, a network customization request from a user, and combine at least one of the control capability and the forwarding capability according to the network customization request, so as to manage a customized-network instance;

wherein in combining at least one of the control capability and the forwarding capability according to the network customization request, so as to manage a customized-network instance, an on-demand mobile network enabler of the capability opening layer is configured to (a) select a required atomic-level control capability and forwarding capability according to the network customization request, (b) send a resource allocation request to a capability abstraction sublayer of the control layer, (c) receive a result of network resource allocation that is performed by the capability abstraction sublayer according to the resource allocation request, and (d) combine the selected atomic-level control capability and forwarding capability based on the result of the network resource allocation, so as to create, modify, or delete the customized-network instance.

18. The customizable mobile broadband network system according to claim 17, wherein:

the forwarding layer is configured to provide a forwarding capability of the mobile broadband network system, wherein the first open interface is configured to open the forwarding capability to the control layer; and the control layer is configured to provide a control capability of the mobile broadband network system, wherein the second open interface is configured to open the control capability and the forwarding capability to the capability opening layer.

\* \* \* \* \*